(12) United States Patent
van Rensburg et al.

(10) Patent No.: US 10,217,029 B1
(45) Date of Patent: Feb. 26, 2019

(54) SYSTEMS AND METHODS FOR AUTOMATICALLY GENERATING HEADSHOTS FROM A PLURALITY OF STILL IMAGES

(71) Applicant: RingCentral, Inc., Belmont, CA (US)

(72) Inventors: Christopher van Rensburg, Foster City, CA (US); Martin Arastafar, Redwood City, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 15/904,659

(22) Filed: Feb. 26, 2018

(51) Int. Cl.
| | |
|---|---|
| G06K 9/62 | (2006.01) |
| G06T 7/10 | (2017.01) |
| G06K 9/00 | (2006.01) |
| G06N 3/02 | (2006.01) |
| G06F 17/30 | (2006.01) |

(52) U.S. Cl.
CPC ..... G06K 9/6267 (2013.01); G06F 17/30256 (2013.01); G06K 9/00302 (2013.01); G06N 3/02 (2013.01); G06T 7/10 (2017.01); G06T 2207/20132 (2013.01)

(58) Field of Classification Search
CPC .... G06K 9/62; G06K 9/6267; G06K 9/00302; G06K 9/00275; G06K 9/00221; G06K 9/00758; G06K 9/00885; G06K 9/00664; G06Q 10/10; G06Q 20/4014; G06Q 30/00; G06Q 30/02; G06Q 40/00; G06Q 40/12; G06Q 50/01; G06T 7/10; G06T 7/0002; G06T 7/174; G06T 13/00; G06T 2207/30201; G06F 17/30256; G06F 17/30578; G06F 3/04845; G06F 3/04883; G06F 21/32; G06F 21/31; G06F 19/02; G06N 3/02; H04L 65/403; H04L 65/1069; H04L 65/1083; H04L 65/601; H04L 65/0861; H04L 65/80; H04L 67/306; H04L 9/0861; H04N 7/15; H04N 7/147; H04N 7/162; H04N 21/23412; H04N 21/4223; H04N 21/44008; H04N 21/47205; H04N 21/4415
See application file for complete search history.

(56) References Cited

U.S. PATENT DOCUMENTS

| | | |
|---|---|---|
| 8,694,899 B2 | 4/2014 | Goossens et al. |
| 9,418,368 B2 | 8/2016 | Jung et al. |

(Continued)

FOREIGN PATENT DOCUMENTS

| | | |
|---|---|---|
| WO | WO 2007/130693 A2 | 11/2007 |
| WO | WO 2016/039835 A1 | 3/2016 |

*Primary Examiner* — Jose L Couso
(74) *Attorney, Agent, or Firm* — Finnegan, Henderson, Farabow, Garrett & Dunner, LLP

(57) ABSTRACT

The present disclosure relates to systems and methods for generating headshots from a plurality of still images. In one implementation, the system may include a memory storing instructions and a processor configured to execute the instructions. The instructions may include instructions to receive a plurality of still images from one or more video feeds, score the plurality of images along a plurality of dimensions based on a scale, rank the plurality of images using at least one of a composite score or at least one of the dimensions, select a subset of the plurality of images using the ranking, and construct at least one headshot of the user from the subset of the plurality of images.

23 Claims, 9 Drawing Sheets

(56) References Cited

U.S. PATENT DOCUMENTS

| | | | |
|---|---|---|---|
| 9,509,741 B2 | 11/2016 | Barjonas et al. | |
| 9,704,231 B1 * | 7/2017 | Kulewski | G06T 7/0002 |
| 2003/0051255 A1 | 3/2003 | Bulman et al. | |
| 2006/0203261 A1 * | 9/2006 | Kacker | G06F 17/30256 |
| | | | 358/1.6 |
| 2009/0313239 A1 * | 12/2009 | Wen | G06F 17/30256 |
| 2012/0293642 A1 * | 11/2012 | Berini | G06F 21/32 |
| | | | 348/77 |
| 2013/0125069 A1 * | 5/2013 | Bourdev | G06F 3/04845 |
| | | | 715/863 |
| 2013/0239025 A1 | 9/2013 | Aaron et al. | |
| 2014/0029859 A1 * | 1/2014 | Libin | G06K 9/00221 |
| | | | 382/224 |
| 2016/0098844 A1 * | 4/2016 | Shaji | G06T 9/002 |
| | | | 382/156 |
| 2017/0212661 A1 * | 7/2017 | Ito | G06F 3/04815 |
| 2018/0268458 A1 * | 9/2018 | Popa | G06Q 30/02 |

* cited by examiner

SYSTEMS AND METHODS FOR AUTOMATICALLY GENERATING HEADSHOTS FROM A PLURALITY OF STILL IMAGES

TECHNICAL FIELD

The present disclosure relates generally to the field of image analysis and transformation. More specifically, and without limitation, this disclosure relates to systems and methods for automatically generating headshots from a plurality of still images.

BACKGROUND

Headshots are used in a variety of computer technologies, such as communications sessions, social network profiles, and the like. However, users generally must pay for professional headshots or manually sort through their own photos to select high-quality headshots for use.

Furthermore, during a communications session or other dynamic use of headshots, a user must manually change headshots when desired. Although a user may receive comments and other feedback on headshots via social networks (such as Facebook, LinkedIn, or the like), the user must manually incorporate this feedback into their use of headshots.

SUMMARY

In view of the foregoing, embodiments of the present disclosure provide systems and methods for training a headshot generator, generating headshots of a user, and indexing and restructuring a headshot database for a user. Accordingly, manual and subjective steps traditionally required by users may be automated. In addition, the headshots may be automatically used in communications sessions, social networks, and other applications and automatically adjusted based on context.

According to an example embodiment of the present disclosure, a system for training a headshot generator may comprise a memory storing instructions and a processor configured to execute the instructions. The instructions may comprise instructions to receive a plurality of training images scored along a first dimension and a second dimension, apply a first classifier to the training images to calculate first scores for the first dimension, calculate a loss function based on the calculated first scores and adjust the first classifier accordingly, apply a second classifier to the training images to calculate second scores for the second dimension, calculate a loss function based on the calculated second scores and adjust the second classifier accordingly, determine composite scores using a function applied to the first scores and the second scores, and calculate a loss function based on the calculated composite scores and adjust the function accordingly.

In some embodiments, at least one of the first dimension and the second dimension include a quality dimension and a lighting dimension.

In some embodiments, at least one of the first dimension and the second dimension include an expression classification and an emotion classification.

In some embodiments, at least one of the first dimension and the second dimension include a rating associated with hair, a rating associated with clothing, and a rating associated with makeup.

In some embodiments, adjusting the first classifier includes adjusting the first classifier to reduce the calculated loss function.

In some embodiments, adjusting the second classifier includes adjusting the second classifier to reduce the calculated loss function.

In some embodiments, adjusting the function includes adjusting the function to reduce the calculated loss function.

In some embodiments, at least one of the first classifier and the second classifier comprises a plurality of cascading classifiers.

In some embodiments, at least one of the first classifier and the second classifier be implemented using a neural network.

In some embodiments, the neural network may comprise a convolutional neural network.

Accordingly to another example embodiment, a method for training a headshot generator may comprise receiving a plurality of training images scored along a first dimension and a second dimension, applying a first classifier to the training images to calculate first scores for the first dimension, calculating a loss function based on the calculated first scores and adjusting the first classifier accordingly, applying a second classifier to the training images to calculate second scores for the second dimension, calculating a loss function based on the calculated second scores and adjusting the second classifier accordingly, determining composite scores using a function applied to the first scores and the second scores, and calculating a loss function based on the calculated composite scores and adjusting the function accordingly.

Any of the alternate embodiments for disclosed systems for training a headshot generator may apply to disclosed methods for training a headshot generator.

According to yet another example embodiment, a non-transitory computer-readable medium may store instructions that, when executed by one or more processors, cause the one or more processors to receive a plurality of training images scored along a first dimension and a second dimension, apply a first classifier to the training images to calculate first scores for the first dimension, calculate a loss function based on the calculated first scores and adjust the first classifier accordingly, apply a second classifier to the training images to calculate second scores for the second dimension, calculate a loss function based on the calculated second scores and adjust the second classifier accordingly, determine composite scores using a function applied to the first scores and the second scores, and calculate a loss function based on the calculated composite scores and adjust the function accordingly.

Any of the alternate embodiments for disclosed systems for training a headshot generator may apply to disclosed non-transitory computer-readable media storing instructions for training a headshot generator.

According to a fourth example embodiment, a system for automatically generating headshots of a user may comprise a memory storing instructions and a processor configured to execute the instructions. The instructions may comprise instructions to receive a plurality of still images from one or more video feeds, score the plurality of images along a plurality of dimensions based on a scale, rank the plurality of images using at least one of a composite score or at least one of the dimensions, select a subset of the plurality of images using the ranking, and construct at least one headshot of the user from the subset of the plurality of images.

In some embodiments, the one or more video feeds may be used in a communications session.

In some embodiments, the plurality of dimensions may include at least one of a quality dimension and a lighting dimension.

In some embodiments, the plurality of dimensions may include at least one of a rating associated with hair, a rating associated with clothing, and a rating associated with makeup.

In some embodiments, the instructions further comprise instructions to classify the headshots based on at least one of expression and emotion.

In some embodiments, the classification may be based on the application of at least one classifier.

In some embodiments, the at least one classifier may comprise a plurality of cascading classifiers.

In some embodiments, the classification may be based on the output of at least one neural network.

In some embodiments, the at least one neural network may comprise a convolutional neural network.

In some embodiments, the at least one of the dimensions may be selected based on a context of the image.

In some embodiments, the composite score may be calculated using weights based on a context of the image.

In some embodiments, the context may comprise at least one of geographic location, time, professionality, job title, and emotion.

In some embodiments, constructing at least one headshot may include cropping one or more of the subset of the plurality of images.

According to another example embodiment, a method for automatically generating headshots of a user may comprise receiving a plurality of still images from one or more video feeds, scoring the plurality of images along a plurality of dimensions based on a scale, ranking the plurality of images using at least one of a composite score or at least one of the dimensions, selecting a subset of the plurality of images using the ranking, and constructing at least one headshot of the user from the subset of the plurality of images.

Any of the alternate embodiments for disclosed systems for automatically generating headshots of a user may apply to disclosed methods for automatically generating headshots of a user.

According to yet another example embodiment, a non-transitory computer-readable medium may store instructions that, when executed by one or more processors, cause the one or more processors to receive a plurality of still images from one or more video feeds, score the plurality of images along a plurality of dimensions based on a scale, rank the plurality of images using at least one of a composite score or at least one of the dimensions, select a subset of the plurality of images using the ranking, and construct at least one headshot of the user from the subset of the plurality of images.

Any of the alternate embodiments for disclosed systems for automatically generating headshots of a user may apply to disclosed non-transitory computer-readable media storing instructions for automatically generating headshots of a user.

According to a seventh example embodiment, a system for indexing and restructuring a headshot database for a user may comprise a memory storing instructions and a processor configured to execute the instructions. The instructions may comprise instructions to receive, from a social network, feedback associated with a headshot, map the received feedback to an identifier of the headshot using the database, adjust a classification of the headshot in the database based on the feedback, and modify an image classifier associated with the classification based on the feedback.

In some embodiments, the adjustment of the classification may be further based on an identity of the social network.

In some embodiments, the headshot may be removed from the database based on the feedback.

In some embodiments, the instructions may further comprise instructions to aggregate feedback across time, and the adjustment of the classification may be based on the aggregated feedback.

In some embodiments, the instructions may further comprise instructions to aggregate feedback across a plurality of social networks, and the adjustment of the classification may be based on the aggregated feedback.

In some embodiments, the instructions may further comprise instructions to send a new headshot from the database to the social network in response to the feedback.

In some embodiments, the instructions may further comprise instructions to send the headshot from the database to a second social network in response to the feedback.

According to another example embodiment, a method for indexing and restructuring a headshot database for a user may comprise receiving, from a social network, feedback associated with a headshot, mapping the received feedback to an identifier of the headshot using the database, adjusting a classification of the headshot in the database based on the feedback, and modifying an image classifier associated with the classification based on the feedback.

Any of the alternate embodiments for disclosed systems for indexing and restructuring a headshot database for a user may apply to disclosed methods for indexing and restructuring a headshot database for a user.

According to yet another example embodiment, a non-transitory computer-readable medium may store instructions that, when executed by one or more processors, cause the one or more processors to receive, from a social network, feedback associated with a headshot, map the received feedback to an identifier of the headshot using the database, adjust a classification of the headshot in the database based on the feedback, and modify an image classifier associated with the classification based on the feedback.

Any of the alternate embodiments for disclosed systems for indexing and restructuring a headshot database for a user may apply to disclosed non-transitory computer-readable media storing instructions for indexing and restructuring a headshot database for a user.

It is to be understood that the foregoing general description and the following detailed description are example and explanatory only, and are not restrictive of the disclosed embodiments.

Further, by employing a communications session and/or social networks in the unconventional manners disclosed herein, systems and apparatuses of the present disclosure improve a user's experience by allowing for automatic and seamless collection, indexing, and use of headshots. In addition, such systems and apparatuses improve the user's experience by allowing for automatic and seamless incorporation of feedback from others into the user's headshot collection. Systems and apparatuses of the present disclosure also improve over extant and manual techniques for collecting and using headshots by employing rules (such as classifiers, scoring functions, feedback processing, and the like) to improve over subjective, manual mechanisms.

BRIEF DESCRIPTION OF THE DRAWINGS

The accompanying drawings, which comprise a part of this specification, illustrate several embodiments and, together with the description, serve to explain the principles disclosed herein. In the drawings.

DETAILED DESCRIPTION

Figure 1:
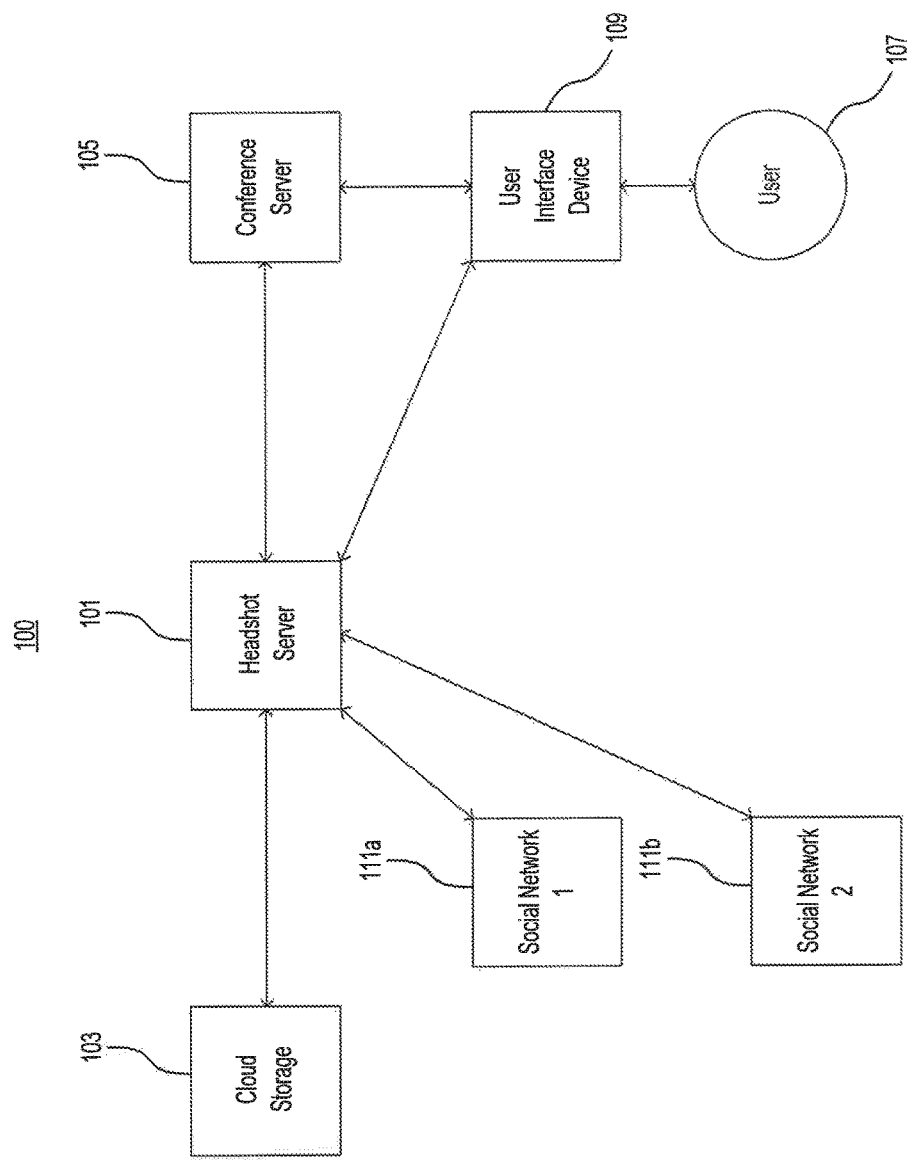
FIG. 1 is a block diagram of an example architecture for automatically generating headshots of a user and for indexing and restructuring a headshot database for a user, according to an example embodiment of the present disclosure.

The disclosed embodiments relate to systems and methods for training a headshot generator, automatically generating headshots of a user, and indexing and restructuring a headshot database. Embodiments of the present disclosure may be implemented using a general-purpose computer. Alternatively, a special-purpose computer may be built according to embodiments of the present disclosure using suitable logic elements.

Disclosed embodiments allow for automatic generation of headshots using one or more video feeds coupled with machine learning techniques. Additionally, embodiments of the present disclosure allow for automatic deployment of headshots in communications sessions and social networks based on context. Furthermore, embodiments of the present disclosure allow for automatic incorporation of feedback from social networks into a headshot database and corresponding classifiers and/or neural networks.

As used herein, the term "image" refers to a digital image stored in one or more computer-readable formats, such as Joint Photographic Experts Group (JPEG) format, bitmap (BMP) file format, Tagged Image File Format (TIFF), Graphics Interchange Format (GIF), Portable Network Graphics (PNG) format, and the like. As used herein, the term "headshot" refers to an image displaying a face of a person.

As used herein, the term "video feed" refers to any sequential series of frames (i.e., images) that are stored together in one or more computer-readable formats, such as a Moving Picture Experts Group (MPEG) format, Real-Video format, Windows Media Video format, or the like. A "video feed" may optionally include audio (whether compressed or uncompressed) in its format.

According to an aspect of the present disclosure, a processor may receive a plurality of training images. For example, the processor may receive the images from one or more storage devices (e.g., a read-only memory (ROM), a random access memory (RAM), a hard disk drive, a flash memory, or the like) using one or more data buses. Alternatively or additionally, the processor may receive the images across one or more computer networks (e.g., by using one or more network interface controllers). For example, the images may be received from a remote server (e.g., hosting one or more cloud storage services).

The training images may be scored along a first dimension and a second dimension. For example, the scores may be included in the image data files themselves or may be stored separately but associated with the image data files via one or more indices. The scores may, for example, be grades (e.g., A, B, C, etc.; "good," "very good," "poor," etc.; or the like), rankings (e.g., number 2 out of 100 images, or the like), integer scores (e.g., 2 out of 5 maximum, or the like), and decimal scores (e.g., 3.125 out of 5 maximum, or the like).

At least one of the first dimension and the second dimension may include a quality dimension and a lighting dimension. For example, the quality dimension may relate to the resolution of the image, the color model of the image, the bit depth of the image, the level of noise in the image, the presence of artifacts in the image, the Peak Signal to Noise Ratio (PSNR) of the image, the Structural Similarity (SSIM) index of the image, the Visual Information Fidelity (VIF) of the image, and the like. The quality dimension may represent a single measure (such as one of the examples listed above) or a plurality of measures. The plurality of measures may be separate (e.g., stored as a matrix or array of measures) or combined (e.g., into a composite measure). The combination of measures may be performed using addition (optionally with weights), averaging (optionally with weights), selecting a median (or other statistical value), or applying any other function to the set of measures to produce a subset of measures or a single composite measure.

In some examples, the lighting dimension may relate to the sharpness of the image, the contrast of the image, the presence of shadows in the image, overexposure or underexposure of the image, the white balance of the image, the color levels of the image, and the like. The lighting dimension may represent a single measure (such as one of the examples listed above) or a plurality of measures. The plurality of measures may be separate (e.g., stored as a matrix or array of measures) or combined (e.g., into a composite measure). The combination of measures may be performed using addition (optionally with weights), averaging (optionally with weights), selecting a median (or other statistical value), or applying any other function to the set of measures to produce a subset of measures or a single composite measure.

In some embodiments, the quality dimension and the lighting dimension may be separate (e.g., stored as a matrix or array of measures). In other embodiments, the quality dimension and the lighting dimension may be combined (e.g., into a composite dimension). The combination of dimensions may be performed using addition (optionally with weights), averaging (optionally with weights), selecting a median (or other statistical value), or applying any other function to the set of dimensions to produce a subset of dimensions or a single composite dimension.

Additionally or alternatively, at least one of the first dimension and the second dimension may include an expression classification and an emotion classification. For example, the expression classification may categorize the facial expression of a person in the image and may include "smiling," "frowning," "neutral," "scowling," or the like. Similarly, the emotion classification may categorize the emotion of a person in the image and may include "happy," "sad," "focused," "neutral," "angry," "confused," "excited," "frustrated," or the like.

Additionally or alternatively, at least one of the first dimension and the second dimension may include a rating associated with hair, a rating associated with clothing, and a rating associated with makeup. In embodiments having more than one rating, the ratings may be separate (e.g., stored as a matrix or array of ratings) or combined (e.g., into a composite measure). The combination of ratings may be performed using addition (optionally with weights), averaging (optionally with weights), selecting a median (or other statistical value), or applying any other function to the set of ratings to produce a subset of ratings or a single composite rating.

In some embodiments, the processor may apply a first classifier to the training images to calculate first scores for the first dimension. As explained above, the scores may, for example, be grades (e.g., A, B, C, etc.; "good," "very good," "poor," etc.; or the like), rankings (e.g., number 2 out of 100 images, or the like), integer scores (e.g., 2 out of 5 maximum, or the like), and decimal scores (e.g., 3.125 out of 5 maximum, or the like).

In some embodiments, the first classifier may consider the entire image. In other embodiments, the first classifier may consider one or more regions of the image. For example, the first classifier may identify hair, a face, a portion of the face (such as lips, a nose, eyes, or the like), clothing, or other objects in the image and then consider one or more regions including the object(s).

After calculating the first scores, the processor may calculate a loss function based on the calculated first scores and adjust the first classifier accordingly. For example, the processor may apply a square loss function, a hinge loss function, a logistic loss function, a cross entropy loss function, or any other appropriate loss function or combination of loss functions.

In some embodiments, adjusting the first classifier includes adjusting the first classifier to reduce the calculated loss function. For example, the processor may adjust the first classifier according to a minimization function applied to the calculated loss function.

In some embodiments, the processor may apply a second classifier to the training images to calculate second scores for the second dimension. As explained above, the scores may, for example, be grades (e.g., A, B, C, etc.; "good," "very good," "poor," etc.; or the like), rankings (e.g., number 2 out of 100 images, or the like), integer scores (e.g., 2 out of 5 maximum, or the like), and decimal scores (e.g., 3.125 out of 5 maximum, or the like).

In some embodiments, the second classifier may consider the entire image. In other embodiments, the second classifier may consider one or more regions of the image. For example, the second classifier may identify hair, a face, a portion of the face (such as lips, a nose, eyes, or the like), clothing, or other objects in the image and then consider one or more regions including the object(s).

After calculating the second scores, the processor may calculate a loss function based on the calculated second scores and adjust the second classifier accordingly. For example, as explained above, the processor may apply a square loss function, a hinge loss function, a logistic loss function, a cross entropy loss function, or any other appropriate loss function or combination of loss functions. The processor may apply the same loss function as applied to the first classifier or may apply a different loss function.

In some embodiments, the processor may select a loss function to apply to a classifier based on one or more properties of the classifier. For example, the processor may use one or more properties of a classifier to select a loss function from a database of loss functions indexed by classifier properties.

In another example, the processor may dynamically determine an optimal loss function to use for a particular classifier. For example, one or more models may be developed and/or trained to select loss functions based on one or more of inputs to the classifier, properties of the classifier, and outputs from the classifier.

In some embodiments, adjusting the second classifier includes adjusting the second classifier to reduce the calculated loss function. For example, the processor may adjust the second classifier according to a minimization function applied to the calculated loss function.

In some embodiments, at least one of the first classifier and the second classifier may comprise a plurality of cascading classifiers. Additionally or alternatively, at least one of the first classifier and the second classifier may be implemented using a neural network. For example, the neural network may have one or more layers, each having one or more neurons. In some embodiments, the neural network may be convolutional.

Although the examples herein use first scores and second scores, additional scores may be calculated. In such embodiments, the classifier for each score may have an associated loss function and be adjusted accordingly.

In some embodiments, the classifiers may be adjusted after each calculation. In other embodiments, the classifiers may be adjusted after all calculations (of scores and/or of loss functions) are complete. In such embodiments, the adjustments may further incorporate synergistic effects between the classifiers and/or the loss functions. For example, if the first classifier and the second classifier have the same loss function (or related loss functions) the processor may adjust the first classifier and the second classifier such that the combined adjustments result in further reduction of the loss function (or further reductions of the related loss functions) than if the first classifier and the second classifier were adjusted separately.

After calculating the first scores and the second scores, the processor may determine composite scores using a function applied to the first scores and the second scores. For example, the function may comprise addition (optionally with weights), averaging (optionally with weights), selecting a median (or other statistical value), or applying any other function to the scores to produce a composite score.

After determining composite scores, the processor may calculate a loss function based on the calculated composite scores and adjust the function accordingly. For example, as explained above, the processor may apply a square loss function, a hinge loss function, a logistic loss function, a cross entropy loss function, or any other appropriate loss function or combination of loss functions. The processor may apply the same loss function as applied to the first classifier and/or the second classifier or may apply a different loss function.

In some embodiments, the processor may select a loss function to apply based on one or more properties of the classifiers that produced the scores used to determine the composite score. For example, the processor may use one or more properties of the classifiers to select a loss function from a database of loss functions indexed by classifier properties.

In another example, the processor may dynamically determine an optimal loss function to use. For example, one or more models may be developed and/or trained to select loss functions based on one or more of inputs to the classifiers, properties of the classifiers, and outputs from the classifiers.

In some embodiments, adjusting the function includes adjusting the function to reduce the calculated loss function. For example, the processor may adjust the function according to a minimization function applied to the calculated loss function.

Although the examples herein use first scores and second scores, additional scores may be calculated. In some embodiments, the additional scores may be included in the determination of the composite score. In other embodiments, one or more of the additional scores may remain independent of the composite score.

According to a second aspect of the present disclosure, a processor may receive a plurality of still images from one or more video feeds. In some embodiments, the processor may receive the still images directly. In other embodiments, the processor may receive the one or more video feeds and extract the still images therefrom. For example, the processor may use one or more frame extraction techniques to extract the still images from the one or more video feeds.

The processor may receive the still images (and/or the one or more video feeds) from one or more storage devices (e.g., a read-only memory (ROM), a random access memory (RAM), a hard disk drive, a flash memory, or the like) using one or more data buses. Alternatively or additionally, the processor may receive the still images (and/or the one or more video feeds) across one or more computer networks (e.g., by using one or more network interface controllers). For example, the still images (and/or the one or more video feeds) may be received from a remote server (e.g., hosting one or more cloud storage services).

In some embodiments, the one or more video feeds may be used in a communications session. For example, the one or more video feeds may be used in a video conferencing session. In such an example, the processor may receive the still images (and/or the one or more video feeds) from a remote server managing the video conferencing session.

The processor may score the plurality of images along a plurality of dimensions based on a scale. The scoring may, for example, output one or more grades (e.g., A, B, C, etc.; "good," "very good," "poor," etc.; or the like), one or more rankings (e.g., number 2 out of 100 images, or the like), one or more integer scores (e.g., 2 out of 5 maximum, or the like), and one or more decimal scores (e.g., 3.125 out of 5 maximum, or the like).

In some embodiments, the processor may score the images using one or more classifiers. For example, the one or more classifiers may be single classifiers, cascading classifiers, or a combination thereof. In certain aspects, each dimension of the plurality of dimensions may have one or more associated classifiers and/or associated set of cascading classifiers. Additionally or alternatively, at least some dimensions of the plurality of dimensions may represent output from the same classifiers (and/or set of cascading classifiers) or from an overlapping set of classifiers (and/or cascading classifiers).

In some embodiments, the one or more classifiers may consider the entire image. In other embodiments, at least one of the one or more classifiers may consider one or more regions of the image. For example, one or more classifiers may identify hair, a face, a portion of the face (such as lips, a nose, eyes, or the like), clothing, or other objects in the image and then consider one or more regions including the object(s).

Additionally or alternatively, the processor may score the images using one or more neural networks. For example, the one or more neural networks may each have one or more layers, each layer having one or more neurons. In some embodiments, at least one of the one or more neural networks may be convolutional.

In some embodiments, the plurality of dimensions may include at least one of a quality dimension and a lighting dimension. For example, the quality dimension may relate to the resolution of the image, the color model of the image, the bit depth of the image, the level of noise in the image, the presence of artifacts in the image, the Peak Signal to Noise Ratio (PSNR) of the image, the Structural Similarity (SSIM) index of the image, the Visual Information Fidelity (VIF) of the image, and the like. The quality dimension may represent a single measure (such as one of the examples listed above) or a plurality of measures. The plurality of measures may be separate (e.g., stored as a matrix or array of measures) or combined (e.g., into a composite measure). The combination of measures may be performed using addition (optionally with weights), averaging (optionally with weights), selecting a median (or other statistical value), or applying any other function to the set of measures to produce a subset of measures or a single composite measure.

In some examples, the lighting dimension may relate to the sharpness of the image, the contrast of the image, the presence of shadows in the image, overexposure or underexposure of the image, the white balance of the image, the color levels of the image, and the like. The lighting dimension may represent a single measure (such as one of the examples listed above) or a plurality of measures. The plurality of measures may be separate (e.g., stored as a matrix or array of measures) or combined (e.g., into a composite measure). The combination of measures may be performed using addition (optionally with weights), averaging (optionally with weights), selecting a median (or other statistical value), or applying any other function to the set of measures to produce a subset of measures or a single composite measure.

In some embodiments, the quality dimension and the lighting dimension may be separate (e.g., stored as a matrix or array of measures). In other embodiments, the quality dimension and the lighting dimension may be combined (e.g., into a composite dimension). The combination of dimensions may be performed using addition (optionally with weights), averaging (optionally with weights), selecting a median (or other statistical value), or applying any other function to the set of dimensions to produce a subset of dimensions or a single composite dimension.

In some embodiments, the plurality of dimensions may include at least one of a rating associated with hair, a rating associated with clothing, and a rating associated with makeup. In embodiments having more than one rating, the ratings may be separate (e.g., stored as a matrix or array of ratings) or combined (e.g., into a composite rating). The combination of ratings may be performed using addition (optionally with weights), averaging (optionally with weights), selecting a median (or other statistical value), or applying any other.

In some embodiments, the processor may classify the headshots based on at least one of expression and emotion. For example, the expression classification may categorize the facial expression of a person in the image and may include "smiling," "frowning," "neutral," "scowling," or the like. Similarly, the emotion classification may categorize the emotion of a person in the image and may include "happy," "sad," "focused," "neutral," "angry," "confused," "excited," "frustrated," or the like.

In some embodiments, the classification may be based on the application of at least one classifier. In some embodiments, the at least one classifier may consider the entire image. Additionally or alternatively, the at least one classifier may consider one or more regions of the image. For example, the at least one classifier may identify hair, a face, a portion of the face (such as lips, a nose, eyes, or the like), clothing, or other objects in the image and then consider one or more regions including the object(s).

In some embodiments, the at least one classifier may comprise a plurality of cascading classifiers. Additionally or alternatively, the classification may be based on the output of at least one neural network. For example, the neural network may have one or more layers, each having one or more neurons. In some embodiments, the neural network may be convolutional.

The processor may rank the plurality of images using at least one of a composite score or at least one of the dimensions. For example, the processor may select one or more of the dimensions and generate one or more rankings therefrom.

In some embodiments, the at least one of the dimensions may be selected based on a context of the image. For example, the context of the image may comprise at least one of geographic location, time, professionality (such as "professional," "business casual," "casual," etc.), job title (such as CEO, Vice President, Teacher, etc.), and emotion (such as happy, sad, frightened, etc.).

In some embodiments, context may be determined from separate data associated with the image, such as location data, time data, data associated with a person in the image, and the like. For example, the image may include tags indicating an associated location, time, person, etc. The context may further be determined from additional data fetched from one or more databases, such as using an associated person tag to fetch additional information associated with the person, e.g., from social networks, from search engines, or the like.

Additionally or alternatively, the context may be determined using one or more classifiers and/or neural networks applied to the image. For example, the identity of the person in the image, the expression of the person, the emotion of the person, and the like may be extracted from the image. The context may further be determined from additional data fetched from one or more databases, such as using an identity of the person to fetch additional information associated with the person, e.g., from social networks, from search engines, or the like.

Additionally or alternatively, the processor may generate a composite score (or a plurality of composite scores) based on or more of the dimensions and generate one or more rankings therefrom. For example, the combination of the one or more of the dimensions may be performed using addition (optionally with weights), averaging (optionally with weights), selecting a median (or other statistical value), or applying any other function to the one or more of the dimensions to produce the composite score.

In some embodiments, the composite score may be calculated using weights based on a context of the image. For example, the combination of one or more of the dimensions into the composite score may be performed using weighted addition, weighted averaging, or the like, where the weights depend on the context. The various embodiments regarding the context explained above with respect to the at least one dimension also apply with respect to the composite score.

In one example, a lighting dimension and/or a score associated with clothing may be weighted more heavily when the context is determined to be professional. In another example, a classification of expression and/or a classification of emotion may be weighted more heavily when the context is determined to be casual.

Additionally or alternatively, the weights may be based on one or more of the dimensions. For example, if an expression classification is "serious", a score associated with hair and/or a score associated with makeup may be weighted more heavily. In another example, if a score associated with clothing indicates very nice and/or professional clothing, a lighting dimension and/or a quality dimension may be weighted more heavily.

The processor may select a subset of the plurality of images using the ranking. For example, only the top five images in the ranking may be selected. In an example with multiple rankings, only images that appear in the top ten of two or more rankings may be selected. The size of the selected subset may be static. For example, the size may be preset to be five, six, seven, eight, nine, ten, or the like. Alternatively, the size of the selected subset may be dynamic. For example, the size may be based on one or more thresholds. In such an example, any number of images having one or more dimensions scored above one or more thresholds may be selected as the subset.

In another example, the size may be based on a number of headshots in a headshot database. For example, the processor may select the top five images in the ranking unless the number of headshots (or of a particular type of headshot, such as professional, casual, happy angry, etc.) in the database exceeds a threshold. In such a case, the processor may select a lower number of images from the ranking based on how close the number of headshots is to the threshold.

In yet another example, the size may be based on a comparison between the one or more dimensions of the images and the one or more dimensions of headshots in a headshot database. For example, the processor may select the top five images in the ranking provided that the number of headshots (or of a particular type of headshot, such as professional, casual, happy angry, etc.) in the database have scores in the one or more dimensions lower than those of the top five images. In such a case, if the headshots in the database have higher scores, the processor may select a lower number of images from the ranking based on a distance between the scorings of the top five images and the scorings of the headshots in the database.

The processor may construct at least one headshot of the user from the subset of the plurality of images. In some embodiments, constructing at least one headshot may include cropping one or more of the subset of the plurality of images. For example, the processor may dynamically determine cropping boundaries based on an identified location and/or boundaries of the face of the person in the image. For example, the term "headshot" refers to an image of at least a portion of an individual's face, e.g., including a mouth (and possibly additional portions such as a chin, a neck, or the like) and a forehead (and possibly additional portions such as hair, scalp, or the like). Thus, in some examples, a headshot is an avatar including an image of the face of a person. The location and/or boundaries may be determined by applying one or more classifiers to the image and/or one or more neural networks.

In some embodiments, the processor may categorize the constructed headshot(s). For example, the constructed headshot(s) may be categorized according to the context of the headshot, the identity of the person in the headshot, an associated location, an associated time, or the like. The categorization may be performed by embedding one or more tags (or other data) into a file encapsulating the headshot. Additionally or alternatively, the categorization may be performed by indexing the file encapsulating the headshot in a headshot database. The headshot database may be stored in one or more storage devices. In some embodiments, at least one of the one or more storage devices may be located remotely (e.g., on a cloud storage server).

In some embodiments, the processor may allow the owner of the headshots to automatically send the headshots to one or more social networks. For example, the owner may instruct the processor to send one or more of the headshots for posting on Facebook, LinkedIn, Instagram, or the like.

According to a third aspect of the present disclosure, a processor may receive, from a social network, feedback associated with a headshot. For example, the social network may comprise a casual network such as Facebook, Twitter, Instagram, Snapchat, or the like, or may comprise a professional network such as LinkedIn, ResearchGate, Academia.edu, Workplace, or the like.

As used herein, the term "feedback" refers to any data associated with the headshot and usually (though not necessarily) originating from a user that is not the owner of the headshot. For example, the feedback may comprise a "like" or other reaction that another user posts on the social network in response to the headshot. In another example, the feedback may comprise a comment or other text posted in response to the headshot. The processor may process the comment or other text using natural language processing (NLP) to extract feedback from the comment or other text (e.g., to extract sentiment using sentiment analysis). In yet another example, the feedback may comprise data regarding how many users viewed the headshot and/or lengths of time for which the users viewed the headshot.

The processor may map the received feedback to an identifier of the headshot using the database. For example, the database may be relational and indexed such that the feedback may be matched with an appropriate identifier of the associated headshot. In another example, the database may be a graph database such that the feedback may be matched with a node associated with the headshot.

The processor may adjust a classification of the headshot in the database based on the feedback. For example, the headshot may be classified as casual if the headshot receives a "haha" reaction on Facebook. In another example, the headshot may be classified as professional if the headshot is viewed on LinkedIn. In yet another example, the headshot may be classified as sad if comments on the headshot include words and phrases such as "I'm sorry," "so sad," or the like.

In some embodiments, the adjustment of the classification may be further based on an identity of the social network. For example, the headshot may be classified as casual if the social network is Facebook, Instagram, or another social network associated with casual interactions. On the other hand, the headshot may be classified as professional if the social network is LinkedIn, ResearchGate, or another social network associated with professional interactions.

In some embodiments, the headshot may be removed from the database based on the feedback. For example, if the headshot receives a "haha" reaction, the headshot may be removed from the database and/or from the social network. In another example, if the comments on the headshots include words and phrases such as "not good," "bad," or the like, the headshot may be removed from the database and/or from the social network.

The processor may modify an image classifier associated with the classification based on the feedback. In some embodiments, modifying the classifier may include adjusting the classifier to reduce an associated loss function. For example, the processor may adjust the classifier according to a minimization function applied to the loss function.

The loss function may be a square loss function, a hinge loss function, a logistic loss function, a cross entropy loss function, or any other appropriate loss function or combination of loss functions. In some embodiments, the processor may select a loss function to apply based on one or more properties of the classifier. For example, the processor may use one or more properties of the classifier to select a loss function from a database of loss functions indexed by classifier properties.

In another example, the processor may dynamically determine an optimal loss function to use. For example, one or more models may be developed and/or trained to select loss functions based on one or more of inputs to the classifiers, properties of the classifiers, and outputs from the classifiers.

The processor may further aggregate feedback across time. In such embodiments, the adjustment of the classification and/or of the classifier may be based on the aggregated feedback. In certain aspects, the classification and/or the classifier may be adjusted when a number of feedbacks falling within the same category surpasses a threshold. For example, if the processor receives one or more "like" reactions as well as one or more comments including the phrases "looking good," "looking great," or the like, the processor may increase one or more scores associated with the corresponding headshot.

In certain aspects, the aggregation across time may depend on a corresponding time frame. For example, the processor may increase one or more scores associated with the corresponding headshot by a larger amount if the processor receives a plurality of "like" reactions within one day and may increase the one or more scores by a lesser amount if the processor receives the plurality of "like" reactions within one month. Similarly, the processor may decrease one or more scores associated with the corresponding headshot by a larger amount if the processor receives a plurality of "dislike" reactions within one week and may decrease the one or more scores by a lesser amount if the processor receives the plurality of "dislike" reactions within a few months.

Additionally or alternatively, the processor may aggregate feedback across a plurality of social networks. In such embodiments, the adjustment of the classification may be based on the aggregated feedback. In certain aspects, the classification and/or the classifier may be adjusted when a number of feedbacks from different social networks and falling within the same category surpasses a threshold. For example, if the processor receives a "like" reaction from at least two social networks, the processor may increase one or more scores associated with the corresponding headshot.

In some embodiments, the processor may send a new headshot from the database to the social network in response to the feedback. For example, if the processor receives one or more "like" reactions from the social network, the processor may send another headshot from the database for posting on the social network. The processor may select the other headshot based on similarity to the headshot for which the feedback was received (e.g., having one or more of the same classifications, having one or more similar scores, etc.).

In some embodiments, processor may send the headshot from the database to a second social network in response to the feedback. For example, if the processor receives one or more comments including the phrases "looking good," "looking great," or the like, the processor may send the headshot to another social network for posting. The processor may select the other social network based on similarity to the social network from which the feedback was received (e.g., having one or more classifications that are the same, having common ownership, etc.).

According to a fourth aspect of the present disclosure, a communications session may have a plurality of participants and shared content. In some embodiments, the conference session may be a video conference session. Optionally, the conference session may also include audio.

Each of the plurality of participants may use one or more user interface devices to connect to the communications session. For example, a user interface device may comprise a laptop computer, a desktop computer, a smartphone, a tablet, or any other device capable of receiving audio and/or video and transmitting it to a collaboration server. As used herein, the term "conference server" refers to one or more servers (which may reside on one or more server farms) executing one or more applications to facilitate a communications session.

In certain aspects, a plurality of participants may share one or more user interface devices. For example, a plurality of participants may connect to the communications session using a single computer within a conference room. Alternatively, a participant may use a user interface device without sharing. For example, a participant may use a tablet or a smartphone for connecting to the communications session.

In some embodiments, a processor of the conference server may receive or determine a context associated with the communications session and/or with a participant therein. For example, the context may be a geographic location of the participant (such as a country, a region, or the like), a geographic location of the company or organization hosting the conference (such as a country, a region, or the like), a company or job title associated with the participant, a tenure associated with the participant, content of the conference, an event associated with the participant and/or the conference, an emotion associated with the participant, or the like.

In some embodiments, the processor may receive the context using a network interface controller (NIC). For example, the user interface device associated with the participant may send the context to the processor over a computer network. In such an example, the user interface device may use at least one NIC to send the context, and the processor may use at least one different NIC to receive the sent context. The NICs may communication over at least one computer network, such as the Internet, a local area network (LAN), or the like.

Additionally or alternatively, the processor may determine the context based on information associated with the participant and/or information associated with the communications session. For example, the processor may assess video and/or audio of the participant to determine the emotion of the participant. In another example, the date or time of the communications session may be determined using metadata attached to a video feed or an audio feed used in the communications session. In yet another example, the composition of the communications session (e.g., based on the job titles of the participants, the stated purchase of the conference, etc.) may be used to determine a level of professionality associated with the communications session.

The processor may select a headshot of a participant from a headshot database to display based on the context. For example, the processor may select a headshot of the participant having an associated emotion that aligns with a determined emotion of the participant. In another example, the processor may select a headshot of the participant having a level of professionality matching (or close to) a determined level of professionality associated with the communications session.

In some embodiments, the processor may select different headshots of the same participant to send to different participants in the communications session. For example, the processor may select a professional headshot of the participant to send to other participants that are higher than the participant in a company chain of command and a casual headshot of the participant to send to other participants that are at the same level as the participant or lower than the participant in a company chain of command.

Additionally or alternatively, the processor may select different headshots of the same participant based on one or more cultural factors associated with other participants. For example, the processor may select a headshot of the participant having a head covering to send to other participants that have an associated cultural factor indicating that women generally wear head coverings in their culture. In another example, the processor may select a headshot of the participant wearing a suit to send to other participants that have an associated cultural factor indicating that businesspersons generally wear suits in their culture. In yet another example, the processor may select a headshot of the participant not wearing a hat to send to other participants that have an associated cultural factor indicating that hats are signs of disrespect.

In some embodiments, the processor may further modify the selected headshot based on the context. For example, the processor may overlay a flag of a country or a region on the headshot of the participant based on a geographic location of the participant. The governmental level associated with the flag may depend on geographic locations of other participants. For example, if the communications session includes participants from Norway, China, Ghana, and Canada, the processor may select country-level flags to overlay on the headshots. In another example, if the communications session includes participants from the United Kingdom, the processor may select region-level flags (such as the flags of England, Wales, Scotland, and the like). In yet another example, if the communications session includes participants from New York State, the processor may select city-level flags (such as the flags of New York City, Albany, Buffalo, and the like). In some examples, such overlays are animated (e.g. flashing, waving, etc.).

In some embodiments, the processor may overlay different flags on the same headshot to send to different participants in the communications session. For example, the processor may select the United States flag to overlay on participants located in the United States and send the overlaid headshot to participants in China and may select the state flags to overlay on participants located in the United States and send the overlaid headshot to participants in the United States. In such an example, the participants in China may thereby be notified of participants that reside in the U.S. and the participants in the U.S. may thereby be notified of participants that reside in other U.S. states.

Additionally or alternatively, the processor may modify a background of the headshot of the participant based on a geographic location of the participant. For example, the processor may select a United States landmark (such as the White House, the Capitol building, or the like) as a background for the headshot and send the overlaid headshot to participants in other countries. In the same example, the processor may select a state landmark (such as Niagara Falls for New York, the Golden Gate Bridge for California, or the like) as a background for the headshot and send the overlaid headshot to participants in the United States.

Additionally or alternatively, the processor may overlay a time indicator based on a time zone of the participant. For example, if the geographic location associated with the participant is Eastern Standard Time, the processor may overlay a tag indicating "EST" or the current time in the Eastern Standard time zone or may overlay a clock indicating the current time in the Eastern Standard time zone on the headshot of the participant.

Additionally or alternatively, the processor may modify a background of the headshot of the participant based on a time zone of the participant. For example, if the geographic location associated with the participant is Eastern Standard Time and it is currently nighttime in the Eastern Standard time zone, the background may be modified to reflect nighttime (e.g., by showing a dark sky, a sky of stars, a moon, etc.). In another example, if the geographic location associated with the participant is Indian Standard Time and it is currently daytime in the Indian Standard time zone, the background may be modified to reflect daytime (e.g., by showing a bright sky, a sky of clouds, a sun, etc.). Other examples include modifying the background to indicate dawn, dusk, twilight, sunrise, sunset, or the like.

In embodiments where the background is geographically determined, the geographically associated background may be modified to show the time zone. For example, if the background included the Washington monument or other U.S. landmark, the sky surrounding the Washington monument may be modified to show the time of day.

Additionally or alternatively, the processor may overlay a date indicator based on the time zone of the participant. For example, if the geographic location associated with the participant is celebrating the New Year, the processor may overlay a tag indicating "Happy New Year."

Additionally or alternatively, the processor may modify a background of the headshot of the participant based on the date. For example, if the geographic location associated with the participant is celebrating Halloween, the background may be modified to reflect decorations associated with Halloween (e.g., by showing a jack-o-lantern, a ghost, etc.). In another example, if the geographic location associated with the participant is currently celebrating the anniversary of the town, the background may be modified to reflect the anniversary (e.g., by showing a parade, etc.).

In embodiments where the background is geographically determined, the geographically associated background may be modified to show the date. For example, if the background included The Forbidden City or other Chinese landmark, the sky surrounding The Forbidden City may be modified to show the date (e.g., by depicting a festival and/or decorations associated with an ongoing celebration in China).

Additionally or alternatively, the processor may overlay a weather indicator based on the current weather in the geographic location of the participant. For example, if the geographic location associated with the participant is experiencing rain, the processor may overlay a tag indicating "rain" or may overlay an icon depicting rain on the headshot of the participant.

Additionally or alternatively, the processor may modify a background of the headshot of the participant based on the weather. For example, if the geographic location associated with the participant is currently experiencing snow, the background may be modified to depict snowing.

In embodiments where the background is geographically determined, the geographically associated background may be modified to show the weather. For example, if the background included the Notre Dame Cathedral or other French landmark, the sky surrounding the Notre Dame Cathedral may be modified to show clouds and falling snow and/or the ground near the Notre Dame Cathedral may be modified to show accumulated snow.

In some embodiments, the processor may overlay a logo of a company or of a group on the headshot of the participant based on an associated organization. The level associated with the logo may depend on the other participants. For example, if the communications session includes participants from different companies, the processor may select company-level logos to overlay on the headshots. In another example, if the communications session includes participants from the same company, the processor may select department-level logos (e.g., a logo representing human resources, a logo representing accounting, or the like).

In some embodiments, the processor may overlay different logos on the same headshot to send to different participants in the communications session. For example, the processor may select the company-level logo to overlay on participants associated with company A and send the overlaid headshot to participants associated with company B and may select the department-level logo to overlay on participants associated with company A and send the overlaid headshot to participants associated with company A. In such an example, the participants in company B may thereby be notified of participants that work for company A and the participants in company A may thereby be notified of participants that work in other departments of company A.

In some embodiments, the processor may overlay an indicator of seniority on the participant. For example, the processor may overlay a badge indicating the number of years that the participant has been employed by the same company, the job title and/or position of the participant in the company, or the like. The level of seniority may also be indicated graphically, such as with a bronze medal for employees with less than five years tenure, a silver medal for employees with five to ten years tenure, and a gold medal for employees with over ten years tenure. Additionally or alternatively, awards and/or achievements may be indicated on a badge, such as employee of the month, number of patents on which the participant is listed as an inventor, or the like.

In some embodiments, the processor may receive, from a calendar associated with the participant, a schedule of events. Based on the schedule, the processor may determine a time at which the participant must leave the communications session and overlay a clock or other indicator of the time of departure on the headshot. In another example, the processor may overlay an indicator of the length of time (e.g., 15 minutes, 30 minutes, etc.) for which the participant may participate in the communications session. In certain aspects, the indicator of the length of time may be a countdown clock.

The processor may send the selected and/or modified headshot to other participants in the communications session. For example, as explained above, some of the other participants may receive a different headshot and/or a headshot with different modifications than the rest of the other participants.

In some embodiments, the processor may send the headshot using a network interface controller (NIC). For example, a user interface device associated with at least one other participant may receive the headshot from the processor over a computer network. In such an example, the processor may use at least one NIC to send the notification, and the user interface device may use at least one different NIC to receive the sent notification. The NICs may communicate over at least one computer network, such as the Internet, a local area network (LAN), or the like.

Turning now to FIG. 1, there is shown an example architecture 100 for automatically generating headshots of a user and for indexing and restructuring a headshot database for a user. As depicted in FIG. 1, system 100 may include a headshot server 101. Headshot server 101 may, for example, comprise one or more of headshot server 901 of FIG. 9. The one or more servers comprising headshot server 101 may be housed on one or more server farms.

In some embodiments, headshot server 101 may be operably connected to cloud storage 103 and/or conference server 105. Although depicted as single elements in FIG. 1, cloud storage 103 and/or conference server 105 may comprise one or more servers (e.g., similar to headshot server 901 of FIG. 9), which may be housed on one or more server farms in the same location or remote locations.

In the example of FIG. 1, user 107 is connected to conference server 105 via user interface device 109. For example, user 107 may be connected via a smartphone, tablet, laptop computer, desktop computer, or the like. Conference server 105 may manage a communications session in which user 107 is participating. For example, the communications session may support the exchange of video and/or audio between user 107 and other participants.

As further depicted in FIG. 1, user interface device 109 may also connect user 107 to headshot server 101. Headshot server 101 may capture images and/or video feeds from user interface device 109. In embodiments where the images and/or video feeds are also used in a communications session managed by conference server 105, headshot server 101 may receive the images and/or video feeds from conference server 105 in lieu of directly from user interface device 109.

User 107 may also interact with headshot server 101 via user interface device 109. For example, user 107 may manage a database of headshots that is created and indexed by headshot server 101. In addition, headshot server 101 may deploy headshots on communications sessions managed by conference server 105. The deployment of headshots may be in accordance with one or more settings provided by user 107 via user interface device 109.

As further depicted in FIG. 1, headshot server 101 may also communicate with one or more social networks, e.g., social network 111a and social network 111b. For example, user 107 may authorize headshot server 101 to post headshots to social network 111a and/or social network 111b and/or to receive information from social network 111a and/or social network 111b (such as information associated with user 107, feedback associated with posted headshots, or the like). Although not depicted in FIG. 1, user 107 may also interact with social network 111a and social network 111b via user interface device 109.

Figure 2:
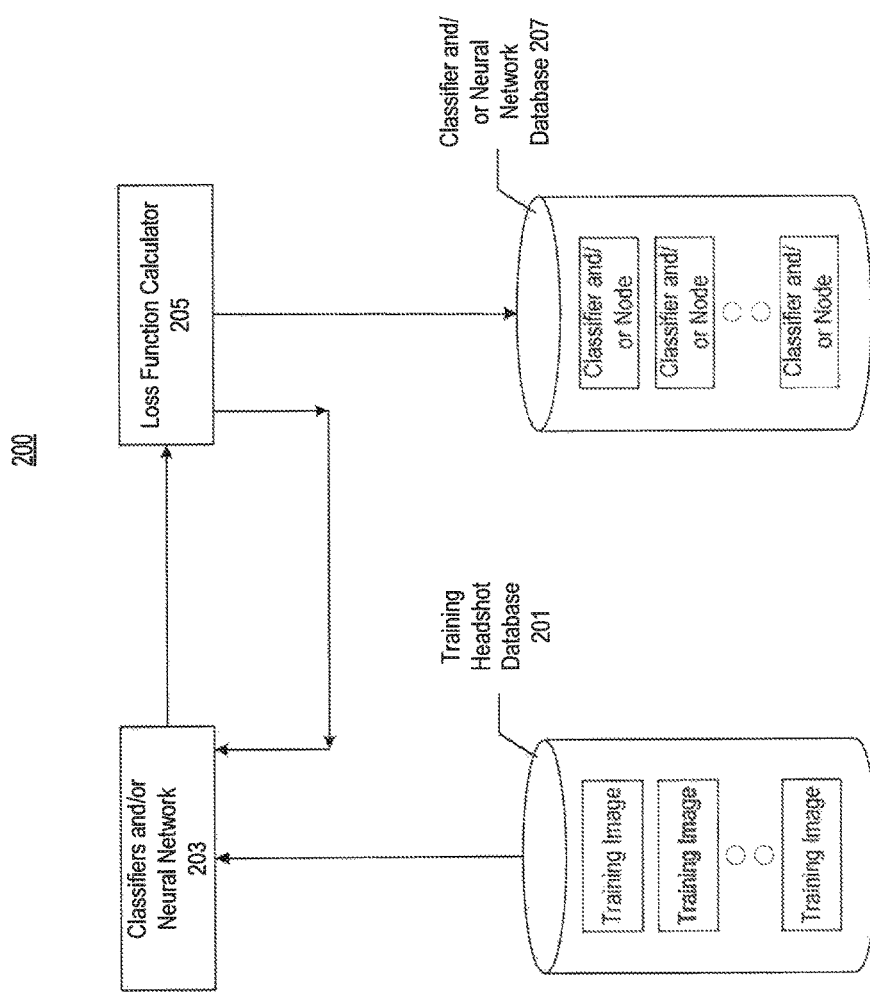
FIG. 2 is a block diagram of an example system for training a headshot generator, according to an example embodiment of the present disclosure.

FIG. 2 depicts an example system 200 for training a headshot generator. System 200 may be implemented on one or more servers, such as headshot server 901 of FIG. 9. The one or more servers may be housed on one or more server farms.

As depicted in FIG. 2, system 200 may include a training headshot database 201. Database 201 may be located on the same server (or server farm) as the remainder of system 200 or may be located remotely, such as on one or more cloud storage servers. Database 201 may include a plurality of training images, and each image may include one or more associated scores, classifications, or the like.

System 200 may run one or more training images from database 201 through one or more classifiers and/or one or more neural networks 203. The classifiers and/or neural networks may operate on each image to generate one or more scores along one or more dimensions and/or one or more classifications within one or more dimensions.

The one or more scores and/or one or more classifications may then be used to calculate one or more associated loss functions using loss function calculator 205. The loss functions may be used to adjust the one or more classifiers and/or one or more neural networks 203. This process may continue iteratively until the one or more classifiers and/or one or more neural networks 203 have converged. In some embodiments, each classifier and/or neural network may be iteratively adjusted until convergence. In other embodiments, the set of classifiers and/or neural networks 203 may be adjusted together (and therefore converge together).

After convergence, each classifier and/or neural network 203 may be saved to database 207. Accordingly, the trained classifiers and/or nodes (forming one or more neural networks) stored in database 207 may be applied to non-training images.

Figure 3:
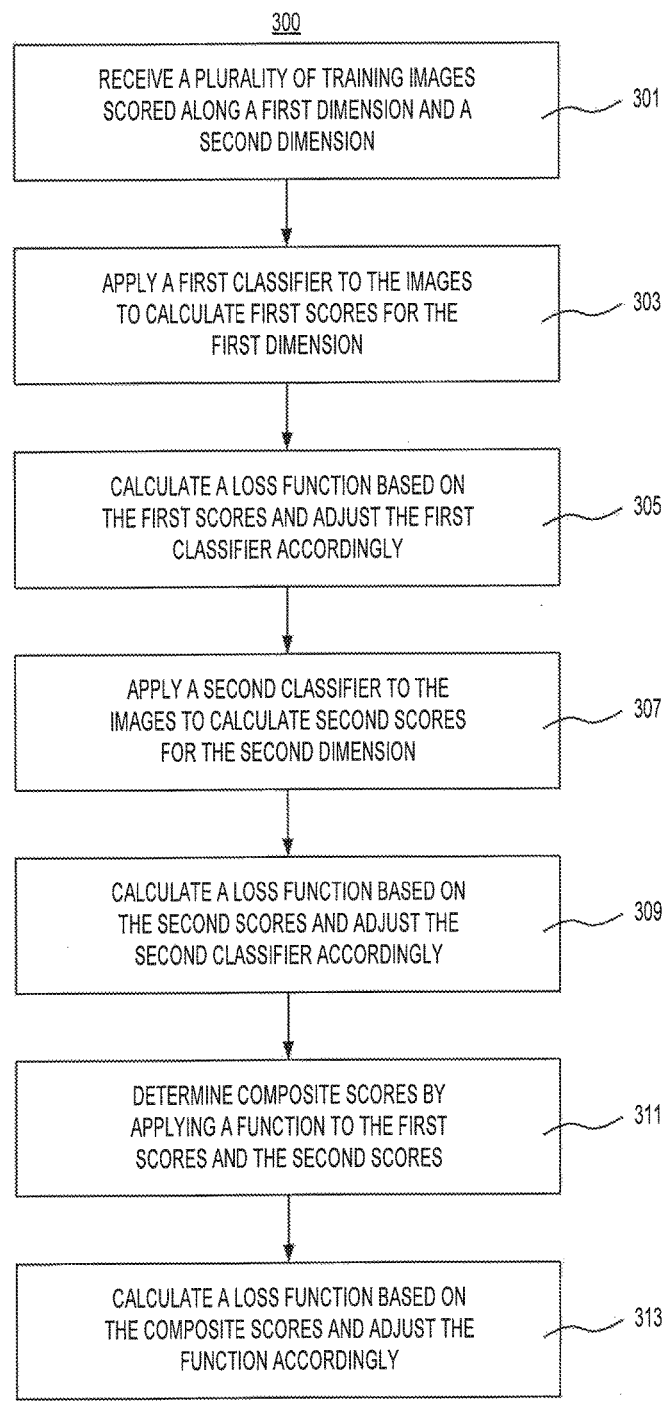
FIG. 3 is a flowchart of an example method for training a headshot generator, according to an example embodiment of the present disclosure.

FIG. 3 is a flowchart of example method 300 for training a headshot generator. Method 300 may be implemented using a general-purpose computer including at least one processor, e.g., server 901 of FIG. 9. Alternatively, a special-purpose computer may be built for implementing method 300 using suitable logic elements.

At step 301, a processor may receive a plurality of training images scored along a first dimension and a second dimension. The processor may receive the images from one or more memories. The one or more memories may be volatile (e.g., random access memory (RAM) or the like) and/or non-volatile (e.g., read-only memory (RAM), hard disk drive, flash memory, or the like). Additionally or alternatively, the processor may receive the images over one or more computer networks (e.g., the Internet, a local area network (LAN), or the like).

In an alternative embodiment with unsupervised learning, the plurality of training images may lack scorings. In such an embodiment, the processor may use one or more alternatives to a loss function to adjust the classifiers. For example, the processor may use one or more clustering techniques (such as k-means clustering), one or more techniques for unsupervised learning of neural networks (such as autoencoding), and/or one or more latent variable models (such as an expectation-maximization algorithm, a method of moments, or the like).

At step 303, the processor may apply a first classifier to the training images to calculate first scores for the first dimension. In some embodiments, the first classifier may comprise a plurality of cascading classifiers. Additionally or alternatively, the first classifier may be implemented using a neural network (optionally a convolutional neural network).

At step 305, the processor may calculate a loss function based on the calculated first scores and adjust the first classifier accordingly. For example, the processor may apply a square loss function, a hinge loss function, a logistic loss function, a cross entropy loss function, or any other appropriate loss function or combination of loss functions. In some embodiments, the processor may select a loss function to apply based on one or more properties of the first classifier. For example, the processor may use one or more properties of the first classifier to select a loss function from a database of loss functions indexed by classifier properties. Additionally or alternatively, the processor may dynamically determine an optimal loss function to use. For example, one or more models may be developed and/or trained to select loss functions based on one or more of inputs to the first classifier, properties of the first classifier, and outputs from the first classifier.

In some embodiments, adjusting the first classifier may include adjusting the first classifier to minimize (or otherwise reduce) the calculated loss function. For example, the processor may adjust the first classifier by applying empirical risk minimization or structural risk minimization (in order to prevent overfitting by incorporating a regularization penalty into the optimization) to the calculated loss function. The optimization may be performed using one or more optimization algorithms or by applying an iterative optimization technique. In some examples of iterative optimization, the processor may repeat one or more of steps 305 to 313 in order to perform the iterative optimization. One or more algorithms and/or estimation techniques may be used to adjust the first classifier, the second classifier, and/or function of step 311 at each stage of the iterative optimization.

At step 307, the processor may apply a second classifier to the training images to calculate second scores for the second dimension. In some embodiments, the second classifier may comprise a plurality of cascading classifiers. Additionally or alternatively, the second classifier may be implemented using a neural network (optionally a convolutional neural network).

At step 309, the processor may calculate a loss function based on the calculated second scores and adjust the second classifier accordingly. For example, the processor may apply a square loss function, a hinge loss function, a logistic loss function, a cross entropy loss function, or any other appropriate loss function or combination of loss functions. Accordingly, the loss function for the calculated second scores may be the same loss function as for the calculated first scores or a different loss function.

In some embodiments, the processor may select a loss function to apply based on one or more properties of the second classifier. For example, the processor may use one or more properties of the second classifier to select a loss function from a database of loss functions indexed by classifier properties. Additionally or alternatively, the processor may dynamically determine an optimal loss function to use. For example, one or more models may be developed and/or trained to select loss functions based on one or more of inputs to the second classifier, properties of the second classifier, and outputs from the second classifier. The one or more models used for the second classifier may also be used for the first classifier or may be different models.

In some embodiments, adjusting the second classifier may include adjusting the second classifier to minimize (or otherwise reduce) the calculated loss function. For example, the processor may adjust the second classifier by applying empirical risk minimization or structural risk minimization (in order to prevent overfitting by incorporating a regularization penalty into the optimization) to the calculated loss function. The optimization may be performed using one or more optimization algorithms or by applying an iterative optimization technique. As explained above, in some examples of iterative optimization, the processor may repeat one or more of steps 305 to 313 in order to perform the iterative optimization. One or more algorithms and/or estimation techniques may be used to adjust the first classifier, the second classifier, and/or function of step 311 at each stage of the iterative optimization.

In some embodiments, at least one of the first dimension and the second dimension may include a quality dimension and a lighting dimension. For example, the quality dimension may relate to the resolution of the image, the color model of the image, the bit depth of the image, the level of noise in the image, the presence of artifacts in the image, the Peak Signal to Noise Ratio (PSNR) of the image, the Structural Similarity (SSIM) index of the image, the Visual Information Fidelity (VIF) of the image, and the like. Moreover, the lighting dimension may relate to the sharpness of the image, the contrast of the image, the presence of shadows in the image, overexposure or underexposure of the image, the white balance of the image, the color levels of the image, and the like.

Additionally or alternatively, at least one of the first dimension and the second dimension may include a rating associated with hair, a rating associated with clothing, and a rating associated with makeup. For example, the rating may include a numerical measure of quality (such as 3 out of 5, 60 out of 100, or the like) of hair, clothing, makeup, etc. Additionally or alternatively, the rating may include a classification (such as "business," "business casual," "casual," or the like) of hair, clothing, and makeup. In such embodiments, the first classifier and/or the second classifier may be applied to only a portion of the image. For example, a classifier producing a rating associated with hair may be configured to identify hair within the image and then classify the identified portion having hair. Similarly, a classifier producing a rating associated with makeup may be configured to identify a face within the image and then classify the identified portion having the face.

Additionally or alternatively, at least one of the first dimension and the second dimension may include an expression classification and an emotion classification. For example, the expression classification may categorize the facial expression of a person in the image and may include "smiling," "frowning," "neutral," "scowling," or the like. Similarly, the emotion classification may categorize the emotion of a person in the image and may include "happy," "sad," "focused," "neutral," "angry," "confused," "excited," "frustrated," or the like.

The first dimension and/or the second dimension may represent a single measure (such as one of the examples listed above) or a plurality of measures. The plurality of measures may be separate (e.g., stored as a matrix or array of measures) or combined (e.g., into a composite measure). The combination of measures may be performed using addition (optionally with weights), averaging (optionally with weights), selecting a median (or other statistical value), or applying any other function to the set of measures to produce a subset of measures or a single composite measure.

In an alternative embodiment, the processor may apply the first classifier and apply the second classifier before calculating the loss function based on the calculated first scores and calculating the loss function based on the calculated second scores. Additionally or alternatively, adjusting the first classifier and the second classifier may be performed after applying both the first classifier and the second classifier or after calculating the loss function based on the calculated first scores and calculating the loss function based on the calculated second scores.

At step 311, the processor may determine composite scores using a function applied to the first scores and the second scores. For example, the function may comprise addition (optionally with weights), averaging (optionally with weights), selecting a median (or other statistical value), or applying any other function to the scores to produce a composite score. Additionally or alternatively, the function may comprise a classification function that classifies the images based on the first scores and the second scores. For example, the function may classify the images as "business," "business casual," "casual," or the like based on the first scores and the second scores. Additionally or alternatively, the function may determine a context for the image (e.g., "executive and business," "coworker and business casual," "friend and casual," or the like) that may be used to determine when the headshot is appropriate for use.

At step 313, the processor may calculate a loss function based on the calculated composite scores and adjust the function accordingly. For example, the processor may apply a square loss function, a hinge loss function, a logistic loss function, a cross entropy loss function, or any other appropriate loss function or combination of loss functions. Accordingly, the loss function for the composite scores may be the same loss function as for the calculated first scores and/or the calculated second scores or a different loss function.

In some embodiments, the processor may select a loss function to apply based on one or more properties of the function. For example, the processor may use one or more properties of the function to select a loss function from a database of loss functions indexed by properties. Additionally or alternatively, the processor may dynamically determine an optimal loss function to use. For example, one or more models may be developed and/or trained to select loss functions based on one or more of inputs to the function, properties of the function, and outputs from the function. The one or more models used for the function may also be used for the first classifier and/or the second classifier or may be different models.

In an alternative embodiment, the processor may determine the composite scores before calculating the loss function based on the calculated first scores and calculating the loss function based on the calculated second scores. Additionally or alternatively, adjusting the first classifier and the second classifier may be performed after determining the composite scores or after calculating the loss function based on the calculated composite scores.

Although described above using a first classifier and a second classifier, method 300 may be implemented using one or more neural networks in addition to or in lieu of the classifiers. As explained above, the neural networks may be trained without the plurality of training images scored along the first dimension and the second dimension (e.g., using unsupervised learning).

Method 300 may further include additional steps. For example, although the example above includes two dimensions, any number of dimensions may be used. All of the extra dimensions may be included in the composite score. Alternatively, some of the extra dimensions may remain separate from the composite score. For example, the training images are scored with a composite score of a first score, a second score, and a third score along with a separate scoring of a fourth score.

Figure 4:
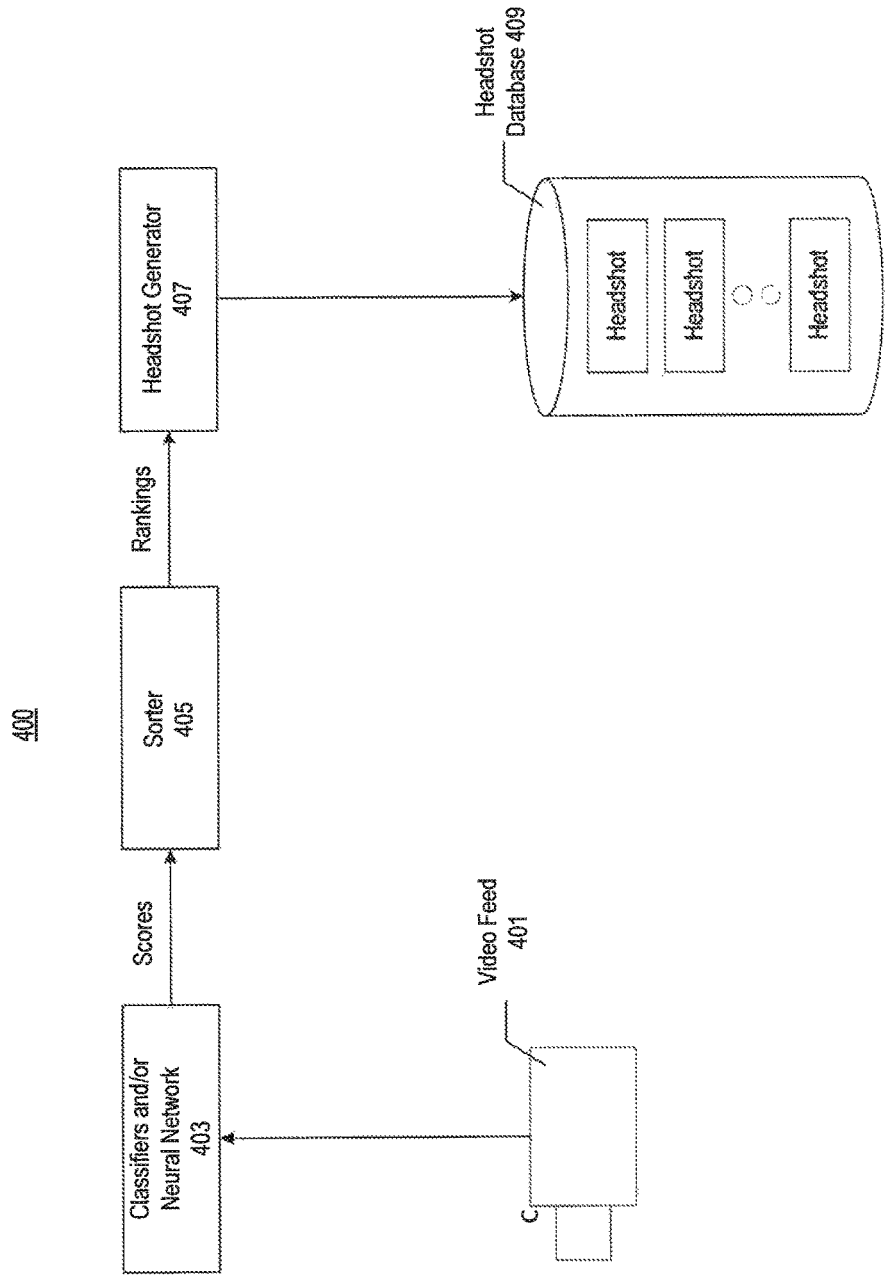
FIG. 4 is a block diagram of an example system for automatically generating headshots of a user, according to an example embodiment of the present disclosure.

FIG. 4 depicts an example system 400 for automatically generating headshots of a user. System 400 may be implemented on one or more servers, such as headshot server 901 of FIG. 9. The one or more servers may be housed on one or more server farms.

As depicted in FIG. 4, system 400 may include a video feed 401. Video feed 401 may be received from one or more cameras (optionally coupled with one or more microphones) and/or other video capture devices. Video feed 401 originate from one or more video capture devices located on the same server (or server farm) as the remainder of system 400 or may be located remotely, such as on one or more cloud storage servers or one or more user devices sending video feed 401 to system 400. System 400 may separate video feed 401 into a plurality of frames (or may receive video feed 401 as a plurality of frames).

System 400 may run one or more frames of video feed 401 through one or more classifiers and/or one or more neural networks 403. The classifiers and/or neural networks may operate on each frame to generate one or more scores along one or more dimensions and/or one or more classifications within one or more dimensions.

The one or more scores and/or one or more classifications may then be used to sort the associated frames using sorter 405. Sorter 405 may generate one or more lists of frames from highest score to lowest score along a particular dimension (or a composite dimension). Additionally or alternatively, sorter 405 may generate groupings of frames based on one or more classifications. In some embodiments, sorter 405 may generate sub-groupings in addition to groupings. For example, sorter 405 may generate a group of frames classified as "professional" as compared to a group of frames classified as "casual," and sorter 405 may generate subgroups for "happy," "neutral," and "frustrated" within both the "professional" group and the "casual" group. The groupings may further include lists of frames as described above. For example, the group "professional" (and/or a subgroup "happy" in the group "professional") may have a list of frames sorted by rating associated with hair, a list of frames sorted by rating associated with clothing, or the like.

The one or more lists and/or groups generated by sorter 405 may be used to select frames to send to headshot generator 407. For example, headshot generator 407 may only use the top number of frames (e.g., the top two frames, the top five frames, etc.) on one or more lists to generate headshots. Headshot generator 407 may only use the top two frames on a list of frames sorted by rating associated with hair to generate headshots, the top five frames on a list of frames sorted by rating associated with clothing to generate headshots, or the like.

Additionally or alternatively, headshot generator 407 may only use frames that overlap on the top of two or more lists. For example, headshot generator 407 may use frames that are within the top five frames on a list of frames sorted by quality scores and are within the top five frames on a list of frames sorted by lighting scores. In another example, headshot generator 407 may use frames that are within the top two frames on a list of frames sorted by quality scores and are within the top five frames on a list of frames sorted by lighting scores. In yet another example, headshot generator 407 may use the top five frames as measured by a composite ranking on a list of frames sorted by quality scores and a list of frames sorted by lighting scores (such as a minimum ranking, a maximum ranking, an average ranking, or the like).

Headshot generator 407 may crop and/or perform other edits on the selected frames to generate headshots therefrom. For example, headshot generator 407 may identify a head in the frame and crop the frame around the head, optionally with one or more padding ranges around the head. The padding range may vary; for example, the padding range for the bottom portion of the frame may be twice the padding range for the sides of the frame, which may be twice the padding range for the upper portion of the frame. Other edits may include increasing or decreasing the brightness and/or contrast of the frame based on one or more optimization functions applied to the frame.

Headshot generator 407 may store the generated headshots in headshot database 409. Headshot database 409 may be stored on the same server (or server farm) as the remainder of system 400 (e.g., on a storage device, memory, or the like) or may be located remotely, such as on one or more cloud storage servers. Headshot database 409 may also be indexed by one or more scores and/or one or more classifications associated with the generated headshots. For example, headshot database 409 may be indexed to maintain the rankings and/or groupings generated by sorter 405.

Figure 5:
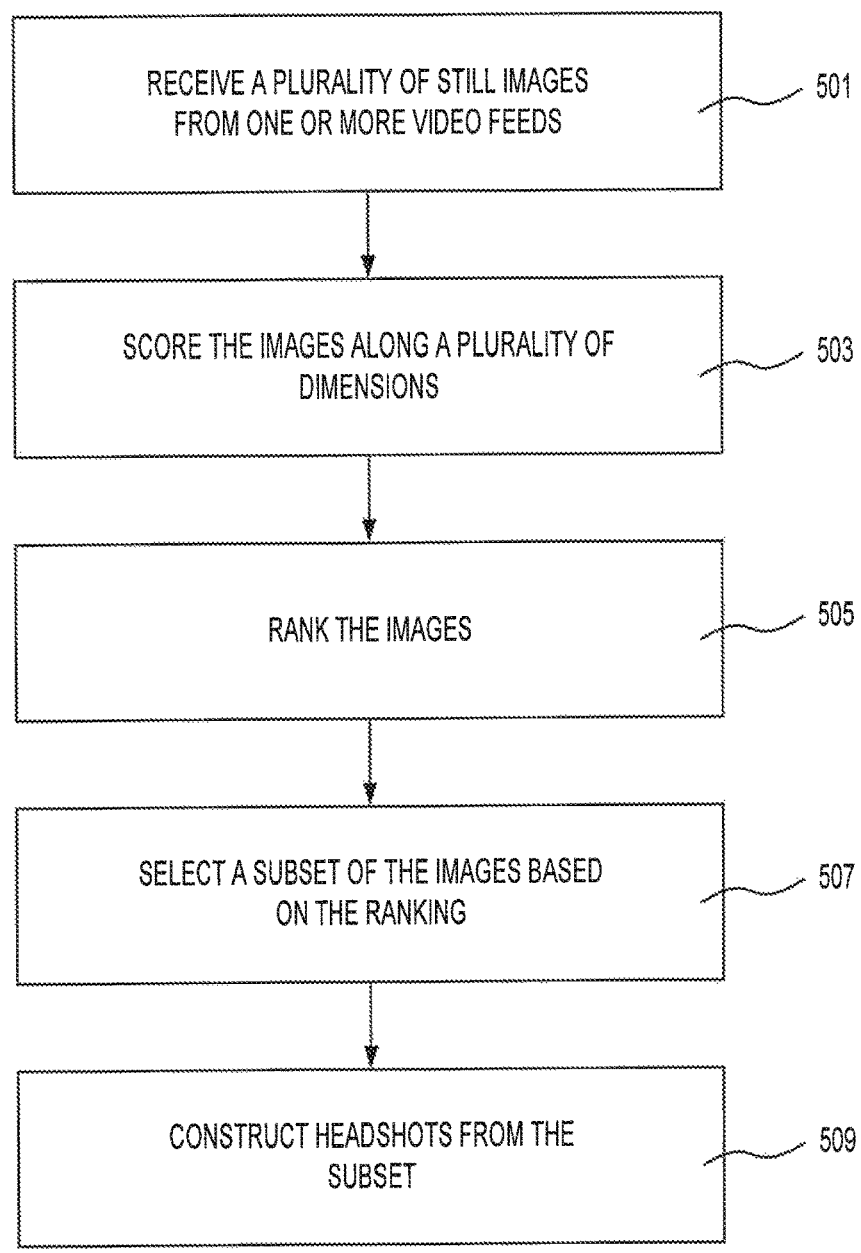
FIG. 5 is a flowchart of an example method for automatically generating headshots of a user, according to an example embodiment of the present disclosure.

FIG. 5 is a flowchart of example method 500 for automatically generating headshots of a user. Method 500 may be implemented using a general-purpose computer including at least one processor, e.g., server 901 of FIG. 9. Alternatively, a special-purpose computer may be built for implementing method 500 using suitable logic elements.

At step 501, a processor may receive a plurality of still images from one or more video feeds. The processor may receive the images from one or more memories. The one or more memories may be volatile (e.g., random access memory (RAM) or the like) and/or non-volatile (e.g., read-only memory (RAM), hard disk drive, flash memory, or the like). Additionally or alternatively, the processor may receive the images over one or more computer networks (e.g., the Internet, a local area network (LAN), or the like). For example, the one or more video feeds may be used in a communications sessions and the still images sent to the processor therefrom. The processor may receive the one or more video feeds directly and extract the still images as frames from the one or more video feeds or may receive the still images extracted from the one or more video feeds by, for example, a communications server managing the communications session.

At step 503, the processor may score the plurality of images along a plurality of dimensions based on a scale. For example, as explained above with respect to method 300, the plurality of dimensions may include at least one of a quality dimension and a lighting dimension and/or at least one of a rating associated with hair, a rating associated with clothing, and a rating associated with makeup. In some embodiments, the scoring may be performed using one or more image classifiers. Optionally, one or more of the classifiers may comprise a plurality of cascading classifiers. Additionally or alternatively, one or more of the classifiers may be implemented using a neural network (optionally a convolutional neural network).

At step 505, the processor may rank the plurality of images using at least one of a composite score or at least one of the dimensions. For example, as explained above with regards to sorter 405 of system 400, the processor may generate one or more lists of images sorted by the composite score and/or the at least one of the dimensions.

In embodiments including a composite score, the composite score may be calculated from the plurality of scores using weights based on a context of the image. For example, a "professional" context may weigh a clothing rating, a hair rating, and/or a makeup rating higher than a lighting score. In embodiments using at least one of the dimensions, the at least one of the dimensions may be selected based on a context of the image. For example, an "executive" context may result in a professionality score being selected as the at least one of the dimensions.

As explained above with regards to system 400, the context used in any of these embodiments may comprise at least one of geographic location, time, professionality, job title, emotion, or the like. The context may be determined from the plurality of images (e.g., using one or more classifiers and/or one or more neural networks) and/or may be received along with the video feeds (or determined from data included with the video feeds, such as indicators of participants in the communications session, locations of participants in the communications session, time zones of participants in the communications session, job titles of participants in the communications session, or the like).

At step 507, the processor may select a subset of the plurality of images using the ranking. For example, as explained above with respect to sorter 405 of system 400, the processor may select the top number of images (e.g., the top two images, the top five images, etc.) on the one or more rankings, may select images that overlap at the top (e.g., the top two, the top five, etc.) of two or more rankings, and/or may select the top number of images (e.g., the top two images, the top five images, etc.) as measured by a composite ranking (such as a minimum ranking, a maximum ranking, an average ranking, or the like) based on two or more rankings.

At step 509, the processor may construct at least one headshot of the user from the subset of the plurality of images. For example, constructing at least one headshot may include cropping one or more of the subset of the plurality of images. Additionally or alternatively, as explained above with respect to headshot generator 407, the processor may increase or decrease the brightness and/or contrast of the selected images based on one or more optimization functions applied to the images. For example, one or more optimization functions (optionally embodied in one or more classifiers and/or one or more neural networks) may determine that a selected image is too bright or too dark and adjust the brightness accordingly. Additionally or alternatively, one or more optimization functions (optionally the same optimization functions used to determine brightness) may determine that a selected image has poor contrast and adjust the contrast accordingly.

Method 500 may include additional or alternative steps. For example, method 500 may additionally include (or alternatively to step 503 include) classifying the headshots based on at least one of expression and emotion. In such embodiments, the processor may additionally in step 505 or alternatively to step 505 group the plurality of images using at least one of a composite classification or at least one of the classifications. The composite classification may be based on a plurality of classification and weights based on a context of the image. Similarly, the at least one of the classifications may be selected based on a context of the image. Moreover, the processor may additionally in step 507 or alternatively to step 507 select a subset of the plurality of images using the grouping.

In some embodiments, the classification may be based on the application of at least one classifier. For example, the at least one classifier may comprise a plurality of cascading classifiers. Additionally or alternatively, the classification may be based on the output of at least one neural network (optionally including a convolutional neural network).

Figure 6:
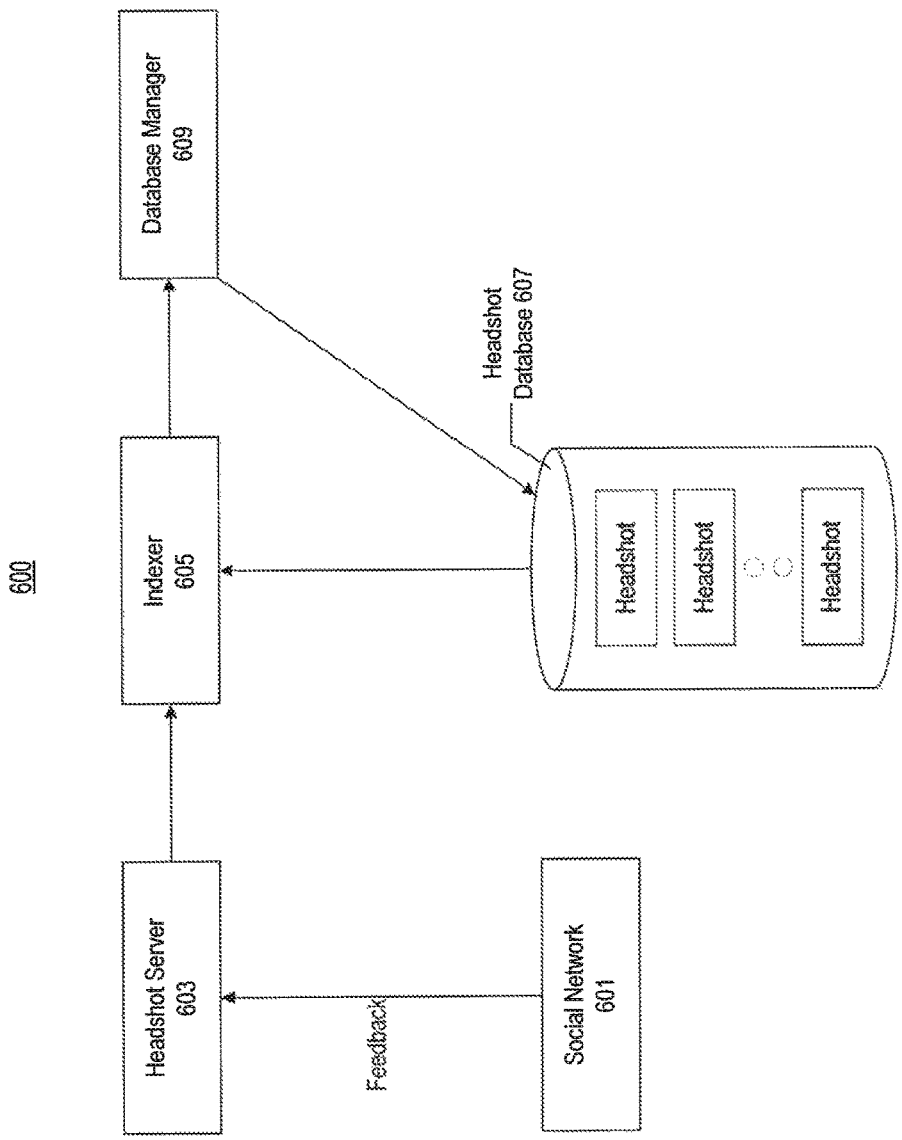
FIG. 6 is a block diagram of an example system for indexing and restructuring a headshot database for a user, according to an example embodiment of the present disclosure.

FIG. 6 depicts an example system 600 for indexing and restructuring a headshot database for a user. System 600 may be implemented on one or more servers, such as headshot server 901 of FIG. 9. The one or more servers may be housed on one or more server farms.

As depicted in FIG. 6, headshot server 603 may receive feedback from a social network 601. As used herein, "social network" may include any website or other platform hosted on one or more servers (optionally servers included in system 600 and/or hosted on the same server farm(s) as system 600) allowing users of the platform to interact with each other. For example, the social network may comprise Facebook, Twitter, Instagram, Snapchat, LinkedIn, ResearchGate, Academia.edu, Workplace, or the like.

The feedback may be associated with a headshot posted on social network 601 and may originate from a user of social network 601 that is not the owner of the headshot. For example, the feedback may comprise a "like" or other reaction that another user posts on the social network in response to the headshot; a comment or other text posted in response to the headshot; or the like. Headshot server 603 may process the comment (or comments) or other text using natural language processing (NLP) to extract feedback from the comment or other text (e.g., to extract sentiment using sentiment analysis, to calculate statistics regarding the occurrence of positive words such as "great," "good," etc. and/or the occurrence of negative words such as "yuck," "bed head," etc.). Additionally or alternatively, the feedback may comprise data regarding how many users viewed the headshot and/or lengths of time for which the users viewed the headshot. Such statistics may be calculated by social network 601 and transmitted to headshot server 603 or calculated by headshot server 603 based on raw data received from social network 601.

Headshot server 603 may use the received feedback to re-index, using indexer 605, an associated headshot stored in headshot database 607. Headshot database 607 (and a corresponding index) may be stored on headshot server 603 (or on the same server farm(s)), e.g., on a storage device, memory, or the like, or may be located remotely, such as on one or more cloud storage servers. Headshot database 607 may be indexed by scores (e.g., quality scores, lighting scores, hair ratings, makeup ratings, clothing ratings, etc.) and/or by classifications (e.g., professional, business casual, casual, etc.).

Indexer 605 may determine an adjustment to one or more scores and/or one or more classifications of the associated headshot based on the received feedback. For example, indexer 605 may increase or decrease an associated score based on the received feedback. In such an example, indexer 605 may increase a quality score if many "like" reactions and/or comments including phrases such as "looking good," "great photo," or the like are received. Similarly, indexer 605 may decrease a quality score if many users viewed the headshot without giving a "like" reaction or leaving a positive comment. Additionally or alternatively, indexer 605 may adjust an associated classification based on the received feedback. In such an example, indexer 605 may re-classify a "business casual" headshot as "professional" if users post comments including phrases such as "very professional," "taking care of business," or the like.

In any of the examples above, indexer 605 may optionally account for a classification of social network 601 from which the feedback is received in addition to the feedback itself. For example, indexer 605 may re-classify a "professional" image as "casual" if positive feedback is received from a more casual social network (such as Facebook or Instagram) as compared to a more professional social network (such as LinkedIn). In another example, indexer 605 may increase a score associated with clothing if "like" reactions are received from a more professional social network as compared to a more casual social network.

Any changes determined by indexer 605 may be imported into headshot database 607 (and/or an index associated therewith) by a database manager 609. For example, database manager 609 may maintain an index associated with headshot database 607. In embodiments where headshot database 607 is stored, whether in whole or in part, remotely from headshot server 603, database manager 609 may communicate changes from indexer 605 to headshot database 607 via one or more computer networks.

Although depicted as separate in FIG. 6, one or more of indexer 605, database manager 609, and headshot database 607 may be implemented on headshot server 603 (or on the same server farm(s) as headshot server 603).

Figure 7:
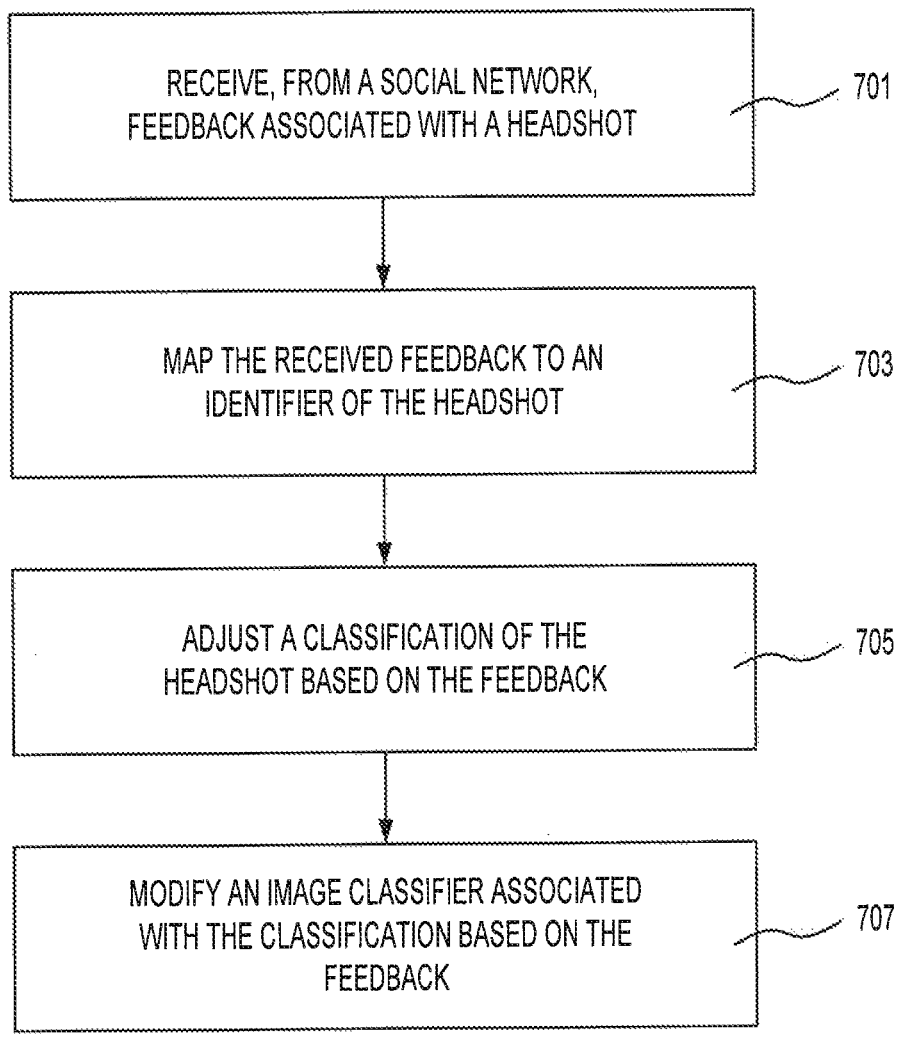
FIG. 7 is a flowchart of an example method for indexing and restructuring a headshot database for a user, according to an example embodiment of the present disclosure.

FIG. 7 is a flowchart of example method 700 for indexing and restructuring a headshot database (e.g. headshot database 607 of FIG. 6) for a user. Method 700 may be implemented using a general-purpose computer including at least one processor, e.g., server 901 of FIG. 9. Alternatively, a special-purpose computer may be built for implementing method 700 using suitable logic elements.

At step 701, a processor may receive, from a social network, feedback associated with a headshot. For example, the processor may receive the feedback over one or more computer networks (e.g., the Internet, a local area network (LAN), or the like).

As explained above with respect to system 600, the feedback may comprise a "like" or other reaction that another user posts on the social network in response to the headshot; a comment or other text posted in response to the headshot; or the like. In embodiments including text, the processor may process the comment (or comments) or other text using natural language processing (NLP) to extract feedback from the comment or other text (e.g., to extract sentiment using sentiment analysis, to calculate statistics regarding the occurrence of positive words such as "great," "good," etc. and/or the occurrence of negative words such as "yuck," "bed head," etc.). Additionally or alternatively, the feedback may comprise statistics regarding how many users viewed the headshot, lengths of time for which the users viewed the headshot, or the like (or the processor may receive raw data from the social network and calculate such statistics rather than directly receiving the statistics).

At step 703, the processor may map the received feedback to an identifier of the headshot using the database. For example, the processor may use a tag or other identifier of a social network post and/or image comprising the headshot included in the feedback to map the feedback to the headshot stored in the database. The mapping may therefore be from an identifier used by the social network to identify the image to a unique identifier used by an index of the database to identify the headshot.

At step 705, as explained above with respect to indexer 605 of system 600, the processor may adjust a classification of the headshot in the database based on the feedback. Additionally or alternatively, as explained above with respect to indexer 605 of system 600, the processor may increase or decrease an associated score based on the received feedback.

In some embodiments, the adjustment of the classification may be further based on an identity of the social network. For example, as explained above with respect to indexer 605 of system 600, the processor may re-classify a "professional" image as "casual" or vice versa depending on whether positive feedback is received from a more casual social network (such as Facebook or Instagram) or a more professional social network (such as LinkedIn). In embodiments where the processor additionally or alternatively modifies an associated score, the processor may increase or decrease the score depending on whether reactions are received from a more professional social network (such as LinkedIn) or a more casual social network (such as Facebook or Twitter).

At step 707, the processor may modify an image classifier associated with the classification based on the feedback. For example, if the image classifier had classified the headshot as "professional," and the headshot is now classified as "casual" based on the feedback, the processor may modify the image classifier to increase its accuracy based on the feedback. For example, as explained above with respect to method 300, the processor may adjust the classifier to minimize (or otherwise reduce) a calculated loss function. That is, a change in classification of the headshot may result in an updated loss function for the associated classifier, which may then undergo modification to minimize (or otherwise reduce) the updated loss function, as explained above with respect to method 300.

Additionally or alternatively, the processor may adjust a classifier associated with one or more scores based on a change in the one or more scores of the headshot. The adjustment may be performed using a loss function as described above.

Alternatively, step 707 may be omitted such that the processor only updates the headshot database and not an image classifier. As one of ordinary skill in the art will recognize, in an alternate embodiment, step 705 may be omitted such that the processor only updates the image classifier and not a headshot database.

Method 700 may include additional or alternative steps. For example, method 700 may additionally include (or alternatively to step 705 include) removing the headshot from the database based on the feedback. In such an embodiment, the processor may remove the headshot from the database if the received feedback is negative. For example, the processor may remove the headshot if a number of comments (optionally exceeding a threshold) including negative words or phrases such as "bad," "not your best," or the like are received. In another example, the processor may remove the headshot if a number of negative reactions (optionally exceeding a threshold), such as "angry" or "sad" are received. In yet another example, the processor may remove the headshot if a number of views exceeds the number of positive reactions (such as "like" or "happy") and/or positive comments (e.g., including the words or phrases "looking good," "great photo," or the like) by more than a threshold (and/or a ratio of views to positive reactions and/or positive comments exceeds a threshold).

Additionally or alternatively, the processor may remove the headshot from the social network. For example, the processor may have authorization (such as a key, a username and password, or the like) and/or belong to a single sign-on service such that the processor has access to an account that owns the headshot and, based on the authorization, the processor may send a command to the social network to delete the headshot (or a post including the headshot).

In another embodiment, method 700 may include aggregating feedback across time. In such an embodiment, the adjustment of the classification (and/or the removal of the headshot) may be based on the aggregated feedback.

Additionally or alternatively, method 700 may include aggregating feedback across a plurality of social networks. In such an embodiment the adjustment of the classification (and/or the removal of the headshot) may be based on the aggregated feedback.

Figure 8:
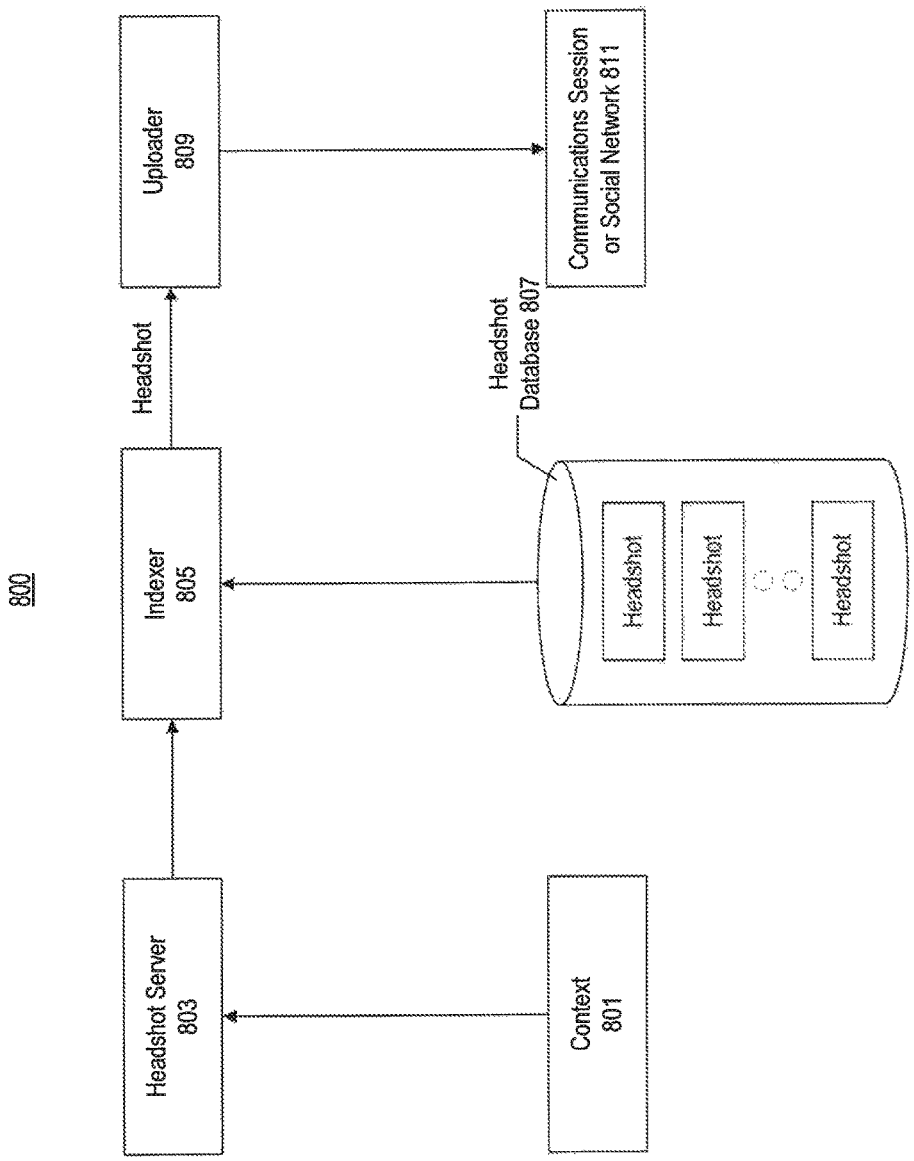
FIG. 8 is a block diagram of an example system for accessing and deploying headshots from a headshot database, according to an example embodiment of the present disclosure.

Method 700 may further include sending a new headshot from the database to the social network in response to the feedback. Additionally or alternatively, the processor may send the headshot from the database to a second social network in response to the feedback FIG. 8 depicts an example system 800 for accessing and deploying headshots from a headshot database. System 800 may be implemented on one or more servers, such as headshot server 901 of FIG. 9. The one or more servers may be housed on one or more server farms.

As depicted in FIG. 8, headshot server 803 may receive context 801. For example, context 801 may be received from a communications server and/or from one or more user devices of users participating in a conference session using the conference server. Additionally or alternatively, context 801 may be received from a social network. As used herein, "context" may refer to a geographic location (e.g., associated with a user in the conference session, associated with the conference session itself, associated with a corporation sponsoring the conference session, etc.), a time or time zone (e.g., associated with a user in the conference session, associated with the conference session itself, associated with a corporation sponsoring the conference session, etc.), a level of professionality (such as "professional," "business casual," "casual," etc., associated with a user of the conference session, a relationship between two or more users of the conference session, associated with a composition of the conference session, associated with the conference session itself, etc.), one or more job titles (such as CEO, Vice President, Teacher, etc., associated with a user of the conference session, etc.), emotion (such as happy, sad, frightened, etc., associated with a user of the conference session, etc.), or the like.

Headshot server 803 may use context 801 to pull, using indexer 805, one or more headshots from headshot database 807. Headshot database 807 (and a corresponding index) may be stored on headshot server 801 (or on the same server farm(s)), e.g., on a storage device, memory, or the like, or may be located remotely, such as on one or more cloud storage servers. Headshot database 807 may be indexed by scores (e.g., quality scores, lighting scores, hair ratings, makeup ratings, clothing ratings, etc.) and/or by classifications (e.g., professional, business casual, casual, etc.).

In one example, indexer 805 may select a headshot by matching an emotion associated with the headshot with an emotion in the context. For example, the context may include an emotion of a participant associated with the headshot (e.g., based on facial expressions from a video feed used in the communications session, based on vocal expressions from an audio feed used in the communications session, or the like), an emotion of a conversation in the communications session (e.g., based on facial expressions from video feeds used in the communications session, based on vocal expressions from audio feeds used in the communications session, or the like), or other emotions determined from the communications session.

In another example, the processor may select a headshot by matching a level of professionality with a level of professionality in the context. The level of professionality may be determined based on known cultural features of one or more participants in the communications session, based on a composition of the communications session, or the like.

In any of these embodiments, different contexts may apply to different relationships within the communications session. For example, one level of professionality may apply to any other participants having a job title indicating they are higher in a corporate structure than the participant while another level of professionality may apply to any other participants having a job title indicating they are at the same level or lower in a corporate structure than the participant. In another example, one level of professionality may apply to any other participants from one culture while another level of professionality may apply to any other participants from another culture.

Optionally, indexer 805 may modify the selected headshots based on the received context. For example, indexer 805 may overlay a flag of a country or a region on the headshot of the participant based on a geographic location included in the context. The geographic location may be based on a location of a participant associated with the headshot, a location of one or more companies sponsoring or participating in the communications session, one or more locations of one or more other participants in the communications session, or other locations determined from the communications session. In another example, indexer 805 may overlay a logo of a company or of a group on the headshot of the participant based on a company or group identifier included in the context. The company or group identifier may be based on a group or company of a participant associated with the headshot, a group or company sponsoring or participating in the communications session, one or more groups or companies of one or more other participants in the communications session, or other groups or companies determined from the communications session. In yet another example, indexer 805 may overlay a time indicator on the headshot of the participant based on a time zone included in the context. The time zone may be based on a time zone of a participant associated with the headshot, a time zone of a group or company sponsoring or participating in the communications session, a time zone of one or more other participants in the communications session, or other time zones determined from the communications session. In another example, indexer 805 may overlay a weather indicator on the headshot of the participant based on weather included in the context. The weather may be based on weather in a location of a participant associated with the headshot, weather in a location of a group or company sponsoring or participating in the communications session, weather in one or more locations of one or more other participants in the communications session, or other weather determined from the communications session.

In any of these embodiments, different contexts may apply to different relationships within the communications session. For example, a particular flag and/or logo may be selected to overlay for any other participants in one location and/or company while another flag and/or logo may apply to any other participants in another location and/or company. In another example, a time indicator may be selected to overlay for any other participants in different time zones than that of the participant while no time indicator may be overlaid for any other participants in the same time zone as that of the participant. In yet another example, a weather indicator may be selected to overlay for any other participants in locations with different weather than that of the participant while no weather indicator may be overlaid for any other participants in locations experiencing the same weather as that of the participant.

The modifications may be to a background of the headshot in addition to or in lieu of an overlay. For example, the background may be modified to one or more landmarks in order to indicate geographic location just as an overlay might. In another example, the background may be modified in order to indicate a time zone just as an overlay might.

Other overlays need not be context based. For example, indexer 805 may overlay an indicator of seniority of the participant. For example, the indicator may include a badge indicating the number of years that the participant has been employed by the same company, the job title and/or position of the participant in the company, or the like, optionally with awards and/or achievements, such as employee of the month, number of patents on which the participant is listed as an inventor, or the like. In another example, indexer 805 may receive, from a calendar associated with a participant associated with the headshot, a schedule of events. Based on the schedule, indexer 805 may determine a time at which the participant must leave the communications session and overlay a clock or other indicator of the time of departure on the headshot. Additionally or alternatively, indexer 805 may overlay an indicator (such as a countdown clock) of the length of time (e.g., 15 minutes, 30 minutes, etc.) for which the participant may participate in the communications session.

The one or more headshots extracted from headshot database 807 by indexer 805 may be uploaded to a communications session and/or a social network 811 by uploader 809. For example, uploader 809 may communicate the one or more headshots from headshot database 807 (and/or from indexer 805) to communications session and/or social network 811 via one or more computer networks. In such an example, uploader 809 may have (or have access to) stored credentials (such as a private key, a username and password, or the like) from a user that allow uploader 809 to send selected headshots to a communications session in which the user is participating and/or to a social network on which the user has an account. Optionally, uploader 809 may participate in a single sign-on system such that uploader 809 has access to the communications session and/or the social network via a directory server.

Although depicted as separate in FIG. 8, one or more of indexer 805, uploader 809, and headshot database 807 may be implemented on headshot server 803 (or on the same server farm(s) as headshot server 803).

The disclosed systems and methods may be implemented on one or more computing devices. Such a computing device may be implemented in various forms including, but not limited to, a client, a server, a network device, a mobile device, a laptop computer, a desktop computer, a workstation computer, a personal digital assistant, a blade server, a mainframe computer, and other types of computers. The computing device described below and its components, including their connections, relationships, and functions, is meant to be an example only, and not meant to limit implementations of the systems and methods described in this specification. Other computing devices suitable for implementing the disclosed systems and methods may have different components, including components with different connections, relationships, and functions.

As explained above, FIG. 9 is a block diagram that illustrates an example headshot server 901 suitable for implementing the disclosed systems and methods. Headshot server 901 may reside on a single server farm or may be distributed across a plurality of server farms.

Figure 9:
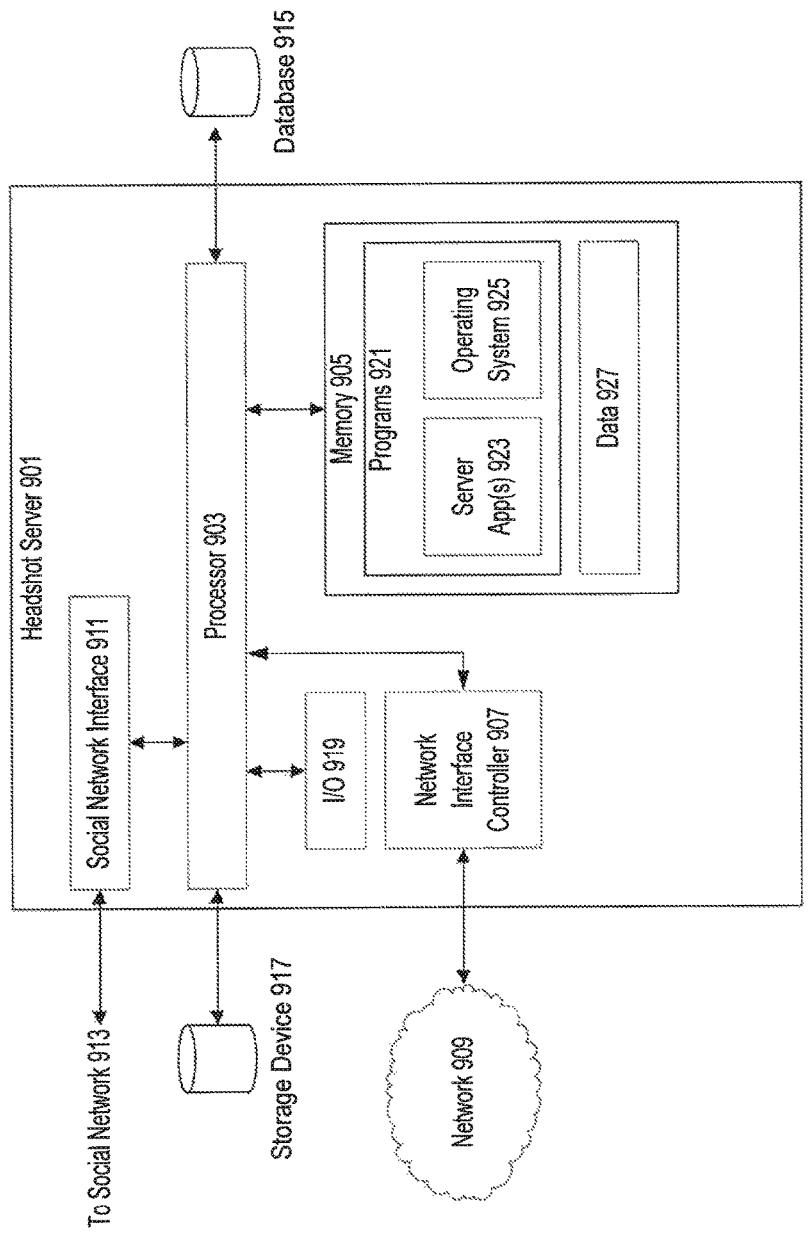
FIG. 9 is a block diagram of an example computing device with which the systems, methods, and apparatuses of the present invention may be implemented.

As depicted in FIG. 9, headshot server 901 may include at least one processor (e.g., processor 903), at least one memory (e.g., memory 905), and at least one network interface controller (NIC) (e.g., NIC 907).

Processor 903 may comprise a central processing unit (CPU), a graphics processing unit (GPU), or other similar circuitry capable of performing one or more operations on a data stream. Processor 903 may be configured to execute instructions that may, for example, be stored on memory 905.

Memory 905 may be volatile memory (such as RAM or the like) or non-volatile memory (such as flash memory, a hard disk drive, or the like). As explained above, memory 905 may store instructions for execution by processor 903.

NIC 907 may be configured to facilitate communication with headshot server 901 over at least one computing network (e.g., network 909). Communication functions may thus be facilitated through one or more NICs, which may be wireless and/or wired and may include an Ethernet port, radio frequency receivers and transmitters, and/or optical (e.g., infrared) receivers and transmitters. The specific design and implementation of the one or more NICs depend on the computing network 909 over which headshot server 901 is intended to operate. For example, in some embodiments, headshot server 901 may include one or more wireless and/or wired NICs designed to operate over a GSM network, a GPRS network, an EDGE network, a Wi-Fi or WiMax network, and a Bluetooth® network. Alternatively or concurrently, headshot server 901 may include one or more wireless and/or wired NICs designed to operate over a TCP/IP network.

Processor 903, memory 905, and/or NIC 907 may comprise separate components or may be integrated in one or more integrated circuits. The various components in headshot server 901 may be coupled by one or more communication buses or signal lines (not shown).

As further depicted in FIG. 9, headshot server 901 may include a social network interface 911 configured to communicate with one or more social networks (e.g., social network 913). Although depicted as separate in FIG. 9, social network interface 911 may, in whole or in part, be integrated with NIC 907.

As depicted in FIG. 9, headshot server 901 may include and/or be operably connected to a database 915 and/or a storage device 917. Database 915 may represent a relational database, object database, document database, or other digital database, which may be stored, in whole or in part, on headshot server 901 and/or, in whole or in part, on a separate server (e.g., cloud storage 103 of FIG. 1). Storage device 917 may be volatile (such as RAM or the like) or non-volatile (such as flash memory, a hard disk drive, or the like).

I/O module 919 may enable communications between processor 930 and memory 905, database 915, and/or storage device 917.

As depicted in FIG. 9, memory 905 may store one or more programs 921. For example, programs 921 may include one or more server applications 923, such as applications that facilitate graphic user interface processing, facilitate communications sessions using NIC 907, facilitate exchanges with social network 913, or the like. By way of further example, programs 921 may include an operating system 925, such as DRAWIN, RTXC, LINUX, iOS, UNIX, OS X, WINDOWS, or an embedded operating system such as VxWorks. Operating system 925 may include instructions for handling basic system services and for performing hardware dependent tasks. In some implementations, operating system 925 may comprise a kernel (e.g., UNIX kernel). Memory 905 may further store data 927, which may be computed results from one or more programs 921, data received from NIC 907, data retrieved from database 915 and/or storage device 917, and/or the like.

Each of the above identified instructions and applications may correspond to a set of instructions for performing one or more functions described above. These instructions need not be implemented as separate software programs, procedures, or modules. Memory 905 may include additional instructions or fewer instructions. Furthermore, various functions of headshot server 901 may be implemented in hardware and/or in software, including in one or more signal processing and/or application specific integrated circuits.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive.

Instructions or operational steps stored by a computer-readable medium may be in the form of computer programs, program modules, or codes. As described herein, computer programs, program modules, and code based on the written description of this specification, such as those used by the processor, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for generating headshots of a user, the system comprising:

a memory storing instructions; and a processor configured to execute the instructions to:

receive a plurality of still images from one or more video feeds, determine a context associated with the plurality of still images, identify a plurality of dimensions based on the determined context, score the plurality of images along the plurality of dimensions based on a scale, rank the plurality of images using at least one of a composite score or at least one of the dimensions, select a subset of the plurality of images using the ranking, and construct at least one headshot of the user from the subset of the plurality of images.

2. The system of claim 1, wherein the one or more video feeds are used in a communications session.

3. The system of claim 1, wherein the plurality of dimensions includes at least one of a quality dimension and a lighting dimension.

4. The system of claim 1, wherein the plurality of dimension includes at least one of a rating associated with hair, a rating associated with clothing, and a rating associated with makeup.

5. The system of claim 1, wherein the instructions further comprise instructions to classify the headshots based on at least one of expression and emotion.

6. The system of claim 5, wherein the classification is based on the application of at least one classifier.

7. The system of claim 6, wherein the at least one classifier comprises a plurality of cascading classifiers.

8. The system of claim 5, wherein the classification is based on the output of at least one neural network.

9. The system of claim 6, wherein the at least one neural network comprises a convolutional neural network.

10. The system of claim 1, wherein the context comprises at least one of geographic location, time, professionality, job title, and emotion.

11. The system of claim 1, wherein the composite score is calculated using weights based on a context of the image.

12. The system of claim 11, wherein the context comprises at least one of geographic location, time, professionality, job title, and emotion.

13. The system of claim 1, wherein constructing at least one headshot includes cropping one or more of the subset of the plurality of images.

14. A method for generating headshots of a user, comprising:

receiving a plurality of still images from one or more video feeds;

determining a context associated with the plurality of still images;

identifying a plurality of dimensions based on the determined context;

scoring the plurality of images along the plurality of dimensions based on a scale;

ranking the plurality of images using at least one of a composite score or at least one of the dimensions;

selecting a subset of the plurality of images using the ranking; and constructing at least one headshot of the user from the subset of the plurality of images.

15. The method of claim 14, wherein the plurality of dimensions includes at least one of a quality dimension, a lighting dimension, a rating associated with hair, a rating associated with clothing, and a rating associated with makeup.

16. The method of claim 14, further comprising classifying the headshots based on at least one of expression and emotion.

17. The method of claim 16, wherein the classification is based on the application of at least one classifier.

18. The method of claim 16, wherein the classification is based on the output of at least one neural network.

19. The method of claim 1, wherein the context comprises at least one of geographic location, time, professionality, job title, and emotion.

20. The method of claim 14, wherein constructing at least one headshot includes cropping one or more of the subset of the plurality of images.

21. A non-transitory computer-readable medium storing instructions that, when executed by one or more processors, cause the one or more processors to:

receive a plurality of still images from one or more video feeds;

determine a context associated with the plurality of still images;

identify a plurality of dimensions based on the determined context;

score the plurality of images along the plurality of dimensions based on a scale;

rank the plurality of images using at least one of a composite score or at least one of the dimensions;

select a subset of the plurality of images using the ranking; and construct at least one headshot of the user from the subset of the plurality of images.

22. The system of claim 1, wherein determining the context is based on at least one of separate data associated with the image or additional data retrieved from one or more databases.

23. The system of claim 1, wherein determining the context comprises applying at least one classifier or at least one neural network to the plurality of still images.

* * * * *